(12) United States Patent
Yamaguchi

(10) Patent No.: US 9,692,985 B2
(45) Date of Patent: Jun. 27, 2017

(54) IMAGE PROCESSING APPARATUS AND IMAGE PROCESSING METHOD FOR TONE CONTROL BY APPLYING DIFFERENT GAIN

(71) Applicant: CANON KABUSHIKI KAISHA, Tokyo (JP)

(72) Inventor: Shota Yamaguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/960,598

(22) Filed: Dec. 7, 2015

(65) Prior Publication Data

US 2016/0094792 A1 Mar. 31, 2016

Related U.S. Application Data

(63) Continuation of application No. 14/176,688, filed on Feb. 10, 2014, now Pat. No. 9,240,037.

(30) Foreign Application Priority Data

Feb. 13, 2013 (JP) ................................. 2013-025897

(51) Int. Cl.
*G06K 9/00* (2006.01)
*H04N 5/243* (2006.01)
*G06T 5/00* (2006.01)
*H04N 1/409* (2006.01)
*H04N 1/407* (2006.01)
*H04N 5/20* (2006.01)
*H04N 5/232* (2006.01)

(52) U.S. Cl.
CPC ............ *H04N 5/243* (2013.01); *G06T 5/004* (2013.01); *G06T 5/008* (2013.01); *H04N 1/409* (2013.01); *H04N 1/4072* (2013.01); *H04N 5/20* (2013.01); *H04N 5/23229* (2013.01)

(58) Field of Classification Search
None
See application file for complete search history.

(56) References Cited

U.S. PATENT DOCUMENTS

| 6,285,798 B1 * | 9/2001 | Lee | G06T 5/004 |
| | | | 382/260 |
| 2003/0179945 A1 * | 9/2003 | Akahori | G06T 5/20 |
| | | | 382/260 |

(Continued)

OTHER PUBLICATIONS

S.N. Pattanaik and H. Yee, "Adaptive Gain Control for High Dynamic Range Image Display," Proc. Spring Conf. Computer Graphics (SCCG2002), 2002.*

*Primary Examiner* — Andrae S Allison
(74) *Attorney, Agent, or Firm* — Cowan, Liebowitz & Latman, P.C.

(57) ABSTRACT

An image processing apparatus includes: a reduced image generation unit configured to obtain a reduced image; a gain data generation unit configured to obtain gain data; and a determination unit configured to determine a control gain required to amplify the input image based on the generated gain data, and letting first gain data be the gain data for an image having a relatively high frequency, and second gain data be the gain data having a relatively low frequency, the determination unit determines the control gain based on a first addition result and a second addition result.

7 Claims, 23 Drawing Sheets

(56) References Cited

U.S. PATENT DOCUMENTS

| | | | |
|---|---|---|---|
| 2005/0047658 A1* | 3/2005 | Kita | H04N 1/62 |
| | | | 382/167 |
| 2005/0057666 A1* | 3/2005 | Hu | H04N 5/2351 |
| | | | 348/229.1 |
| 2006/0158529 A1* | 7/2006 | Katagiri | H04N 3/155 |
| | | | 348/222.1 |
| 2007/0098294 A1* | 5/2007 | Xu | H04N 19/176 |
| | | | 382/264 |
| 2007/0286588 A1* | 12/2007 | Hatano | G03B 17/00 |
| | | | 396/88 |
| 2009/0278957 A1* | 11/2009 | Tanaka | G06T 5/007 |
| | | | 348/229.1 |
| 2010/0026857 A1* | 2/2010 | Bok | H04N 5/2352 |
| | | | 348/241 |
| 2010/0134650 A1* | 6/2010 | Kim | H04N 5/2351 |
| | | | 348/229.1 |
| 2010/0165193 A1* | 7/2010 | Kanai | H04N 5/58 |
| | | | 348/453 |
| 2013/0258175 A1* | 10/2013 | Osawa | H04N 5/2351 |
| | | | 348/364 |
| 2014/0072180 A1* | 3/2014 | Yamaguchi | G06T 7/2053 |
| | | | 382/107 |
| 2014/0111532 A1* | 4/2014 | Manchi | G06T 3/4007 |
| | | | 345/582 |
| 2014/0152694 A1* | 6/2014 | Narasimha | G09G 5/377 |
| | | | 345/629 |

* cited by examiner

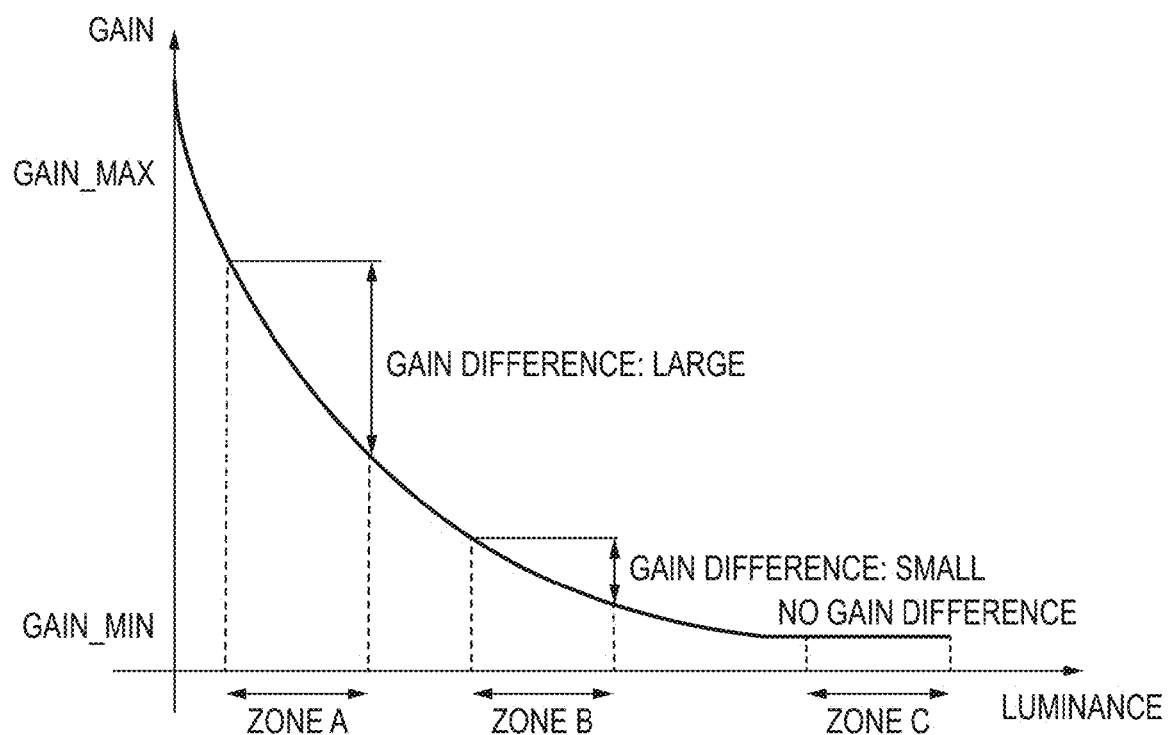
F I G. 15

IMAGE PROCESSING APPARATUS AND IMAGE PROCESSING METHOD FOR TONE CONTROL BY APPLYING DIFFERENT GAIN

CROSS-REFERENCE TO RELATED APPLICATIONS

This application is a continuation of application Ser. No. 14/176,688, filed Feb. 10, 2014 the entire disclosure of which is hereby incorporated by reference.

BACKGROUND OF THE INVENTION

Field of the Invention

The present invention relates to a technique required to control tone characteristics by applying different gains to respective portions of an input image.

Description of the Related Art

Conventionally, a digital dodging process for controlling tone characteristics by applying different gains to respective portions of an input image has been proposed. For example, this dodging process is applied to a so-called backlight scene in which the brightness of a main object to be shot is considerably lower than that of a background. In the backlight scene, when the brightness of an entire image is controlled to an appropriate level, the main object is generally shot darkly. Therefore, using luminance-dependent gains intended to apply a relatively large gain to a dark portion, the darkly shot main object is controlled to an appropriate brightness. The aforementioned process is the basic concept of the dodging process.

Furthermore, as an input luminance upon calculation of luminance-dependent gains, a low-frequency image generated from luminance components of an input image is used. This is because when an input image is used intact as an input luminance used to calculate luminance-dependent gains, a large gain is unwantedly applied to every dark object portions and black object portions in an image, and a contrast of an image after a gain process is considerably impaired. Therefore, using the low-frequency image, the influence of local dark portions in an image is reduced, and gain sensitivity to luminance changes of an image lowers, thus executing the dodging process while maintaining a resolution of an output image.

However, when the dodging process is executed using the low-frequency image, a pseudo edge is generated near edge portions between a low-luminance region and high-luminance region, as shown in FIG. 25. In the example shown in FIG. 25, a small blur signal and large blur signal as low-frequency components of a source signal are used in addition to the source signal. When a gain table has a pattern which is decreased largely relatively at a low-luminance side, as shown in FIG. 25, a gain converted from the blur signal is largely decreased on the low-luminance region side of an edge portion. This is because a value of the blur signal of the edge portion becomes large due to the influence of the high-luminance region side. Therefore, a black-rimmed pseudo edge is generated, as shown in FIG. 25. This phenomenon occurs dominantly as a range of a gain to be multiplied (a difference between GAIN_MAX and GAIN_MIN) becomes larger.

To solve the aforementioned problems, for example, techniques described in Japanese Patent Laid-Open Nos. 2010-244360 and 2009-272983 have been proposed.

In Japanese Patent Laid-Open No. 2010-244360, gains are calculated from a plurality of luminance images having different frequency bands. Then, when a gain calculated from a relatively low-frequency image exceeds that calculated from a relatively high-frequency image, the contribution of the gain calculated from the relatively low-frequency image is controlled to be reduced. More specifically, a use ratio of the gain calculated from the high-frequency image is increased.

In Japanese Patent Laid-Open No. 2009-272983, images having different frequency bands are used as in Japanese Patent Laid-Open No. 2010-244360, an image is divided into regions based on luminance values of a relatively high-frequency image, and a gain value calculated from a relatively low-frequency image is corrected by a region division result.

However, Japanese Patent Laid-Open No. 2010-244360 merely describes a measure against a case in which a gain calculated from a low-frequency image becomes relatively large, that is, a measure against pseudo tones like a white-rimmed high-luminance region, and cannot cope with pseudo tones of a low-luminance region. Also, when a gain to be multiplied with the low-luminance region becomes large, the method of Japanese Patent Laid-Open No. 2010-244360 cannot provide a sufficient effect, and pseudo tones are left unremoved.

Japanese Patent Laid-Open No. 2009-272983 does not describe a measure against a case in which gains having largely different gains are mixed in a single region, as shown in FIG. 25, and a gain to be re-calculated in that region is influenced by the largely different gains.

SUMMARY OF THE INVENTION

The present invention has been made in consideration of the aforementioned problems, and suppresses generation of a pseudo edge while maintaining a satisfactory contrast of an output image when tone characteristics are controlled by applying different gains to respective portions of an input image.

According to the first aspect of the present invention, an image processing apparatus comprises: a reduced image generation unit configured to obtain a reduced image by reducing an input image; a gain data generation unit configured to obtain gain data by associating luminance values for respective pixels with gains in association with a plurality of images, which include the reduced image and have different reduction ratios; and a determination unit configured to determine a control gain required to amplify the input image based on the generated gain data, wherein the determination unit determines the control gain based on a first addition result as an addition result of gains corresponding to pixels of interest of first gain data and second gain data, and a second addition result as an addition result of a gain corresponding to the pixel of interest of the first gain data, and a gain based on gains corresponding to pixels of a surrounding region of the pixel of interest in the second gain data, wherein the first gain data is data for an image having a relatively high frequency of the plurality of images and the second gain data is data having a relatively low frequency of the plurality of images.

According to the second aspect of the present invention, an image processing apparatus comprises: a reduced image generation unit configured to obtain a reduced image by reducing an input image; an image addition unit configured to add a plurality of images which include the reduced image and have different reduction ratios; and a determination unit configured to determine a control gain required to amplify the input image based on luminance values of the added image, wherein the image addition unit performs weighted addition of a first addition result as an addition result of pixel values of pixels of interest of a first image and a second image, and a second addition result as an addition result of a pixel value of the pixel of interest of the first image, and a pixel value based on pixel values of pixels in a surrounding region of the pixel of interest in the second image, wherein the first image is an image having a relatively high frequency of the plurality of images and the second image is an image having a relatively low frequency of the plurality of images.

According to the third aspect of the present invention, an image processing apparatus comprises: a gain data generation unit configured to obtain gain data based on an input image; a reduced data generation unit configured to obtain reduced gain data by reducing the generated gain data; and a determination unit configured to determine a control gain required to amplify the input image based on a plurality of gain data which include the reduced gain data and have different reduction ratios, wherein the determination unit determines the control gain based on a first addition result as an addition result of gains corresponding to pixels of interest of first gain data and second gain data, and a second addition result as an addition result of a gain corresponding to the pixel of interest of the first gain data, and a second addition result as an addition result of a gain corresponding to the pixel of interest of the first gain data and a gain based on gains corresponding to pixels in a surrounding region of the pixel of interest in the second gain data, wherein the first gain data is data having a relatively high frequency of the plurality of gain data and the second gain data is data having a relatively low frequency of the plurality of gain data.

According to the fourth aspect of the present invention, an image processing apparatus comprises: a band-limited image generation unit configured to generate, from an input image, a band-limited image having a frequency band different from the input image; a gain data generation unit configured to obtain gain data respectively for a plurality of images which include the band-limited image and have different frequency bands; and a determination unit configured to determine a control gain required to amplify the input image based on the generated gain data, wherein the determination unit determines the control gain based on a first addition result as an addition result of gains corresponding to pixels of interest of first gain data and second gain data, and a second addition result as an addition result of a gain corresponding to the pixel of interest of the first gain data and a gain based on gains corresponding to pixels in a surrounding region of the pixel of interest in the second gain data, the first gain data is data for an image having a relatively high frequency of the plurality of images and the second gain data is data for an image having a relatively low frequency of the plurality of images.

According to the fifth aspect of the present invention, an image processing apparatus comprises: a band-limited image generation unit configured to generate, from an input image, a band-limited image having a frequency band different from the input image; an image addition unit configured to add a plurality of images which include the band-limited image and have different frequency bands; and a determination unit configured to determine a control gain required to amplify the input image based on luminance values of the added image, wherein the image addition unit performs weighted addition of a first addition result as an addition result of pixel values of pixels of interest of a first image and a second image, and a second addition result as an addition result of a pixel value of the pixel of interest of the first image and a pixel value based on pixel values of pixels in a surrounding region of the pixel of interest in the second image, wherein the first image is an image having a relatively high frequency of the plurality of images and the second image is an image having a relatively low frequency of the plurality of images.

According to the sixth aspect of the present invention, an image processing apparatus comprises: a gain data generation unit configured to obtain gain data based on an input image; a band-limited data generation unit configured to generate band-limited data having a frequency band different from the generated gain data; and a determination unit configured to determine a control gain required to amplify the input image based on a plurality of gain data including the band-limited data, wherein the determination unit determines the control gain based on a first addition result as an addition result of gains corresponding to pixels of interest of first gain data and second gain data, and a second addition result as an addition result of a gain corresponding to the pixel of interest of the first gain data, and a gain based on gains corresponding to pixels in a surrounding region of the pixel of interest in the second gain data, wherein the first gain data is data having a relatively high frequency of the plurality of gain data and the second gain data is data having a relatively low frequency of the plurality of gain data.

Further features of the present invention will become apparent from the following description of exemplary embodiments with reference to the attached drawings.

BRIEF DESCRIPTION OF THE DRAWINGS

FIG. 15 is a graph showing the relationship between a luminance difference and gain difference;

DESCRIPTION OF THE EMBODIMENTS

Embodiments of the present invention will be described in detail hereinafter with reference to the drawings. Note that embodiments to be described hereinafter are presented only for the exemplary purpose so as to implement the present invention, and are to be appropriately modified or changed depending on the arrangement of an apparatus and various conditions to which the present invention is applied. Hence, the present invention is not limited to the following embodiments. The following embodiments will explain an example in which the present invention is applied to an image processing apparatus which includes an image capturing unit, and is represented by a digital still camera, digital video camera, and the like.

(First Embodiment)

Figure 1:
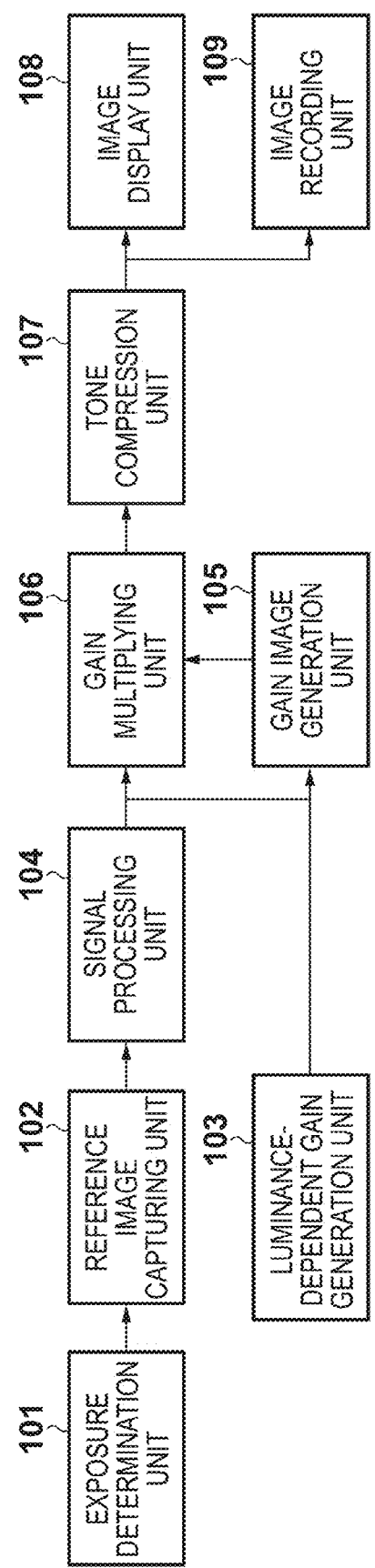
FIG. 1 is a block diagram showing the arrangement of an image processing apparatus common to respective embodiments of the present invention.
Figure 2:
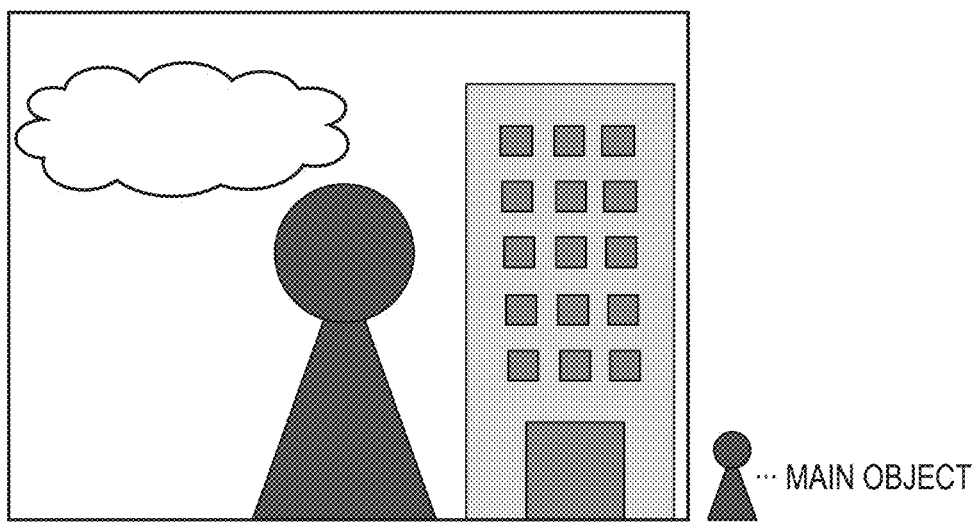
FIG. 2 is a view showing a backlight scene assumed in the first embodiment.

FIG. 1 is a block diagram showing the arrangement of an image processing apparatus common to respective embodiments of the present invention. Since this embodiment assumes correction of a backlight scene, FIG. 2 shows an example of the backlight scene assumed in this embodiment. As shown in FIG. 2, in the backlight scene, a background is especially brighter than a main object. Respective blocks will be described in detail below with reference to FIGS. 1 and 2.

An exposure determination unit 101 determines an exposure amount upon shooting an input image. This embodiment does not particularly designate a determination method, and uses, for example, an evaluation photometry method. In the evaluation photometry method, an image is divided into predetermined regions, luminance values (luminance signals) calculated for respective regions are weighted and averaged using predetermined weights so as to calculate a representative luminance value of the scene, and an exposure amount is determined based on that luminance value.

A reference image capturing unit 102 captures an image using an exposure amount set by the exposure determination unit 101. The image captured by this unit will be referred to as a reference image hereinafter. When the exposure amount is determined by the aforementioned method, a main object is shot to be darker than its actual appearance in the general backlight scene shown in FIG. 2.

Figure 3:
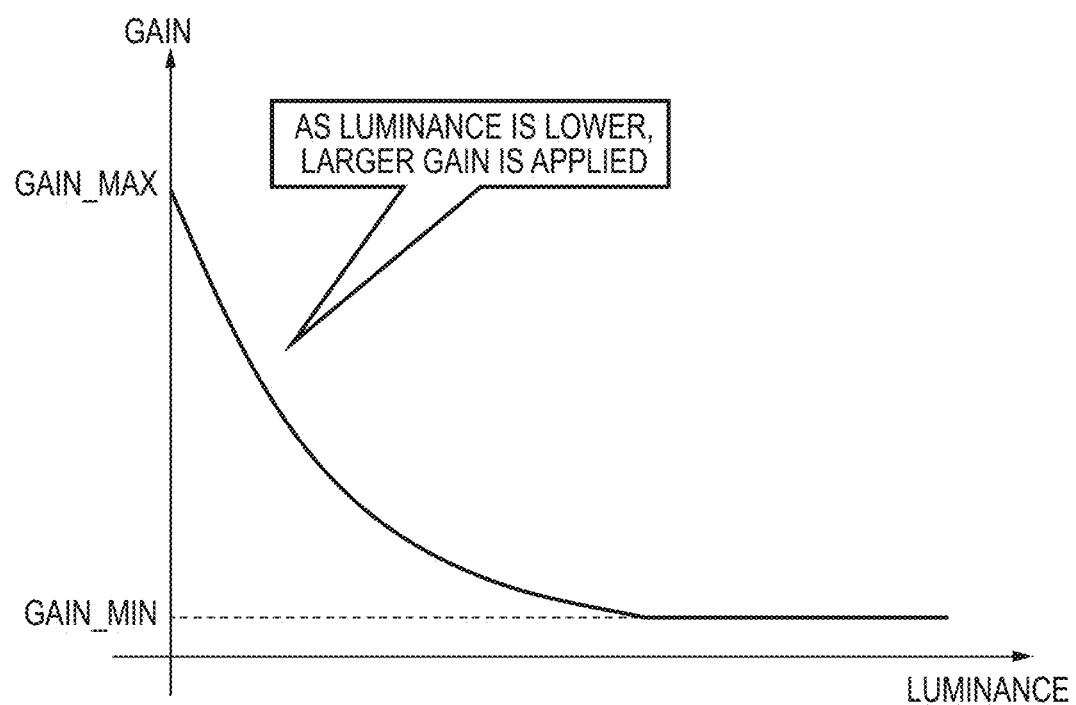
FIG. 3 is a graph showing an overview of luminance-dependent gains assumed in the first embodiment.

A luminance-dependent gain generation unit 103 determines characteristics of a gain by which the reference image is multiplied. The characteristics of the gain correspond to a gain table with respect to luminance values. In this embodiment, in order to correct a target backlight scene, the characteristics of the gain need only be controlled to obtain a bright main object region shown in FIG. 2. Hence, as shown in FIG. 3, luminance-dependent gains are generated to have a pattern to apply a larger gain as a luminance level is lower.

A signal processing unit 104 applies predetermined signal processes to the reference image. In this embodiment, for example, an optical correction process and noise reduction process are executed as the signal processes.

<Gain Image Generation Unit 105>

Figure 4:
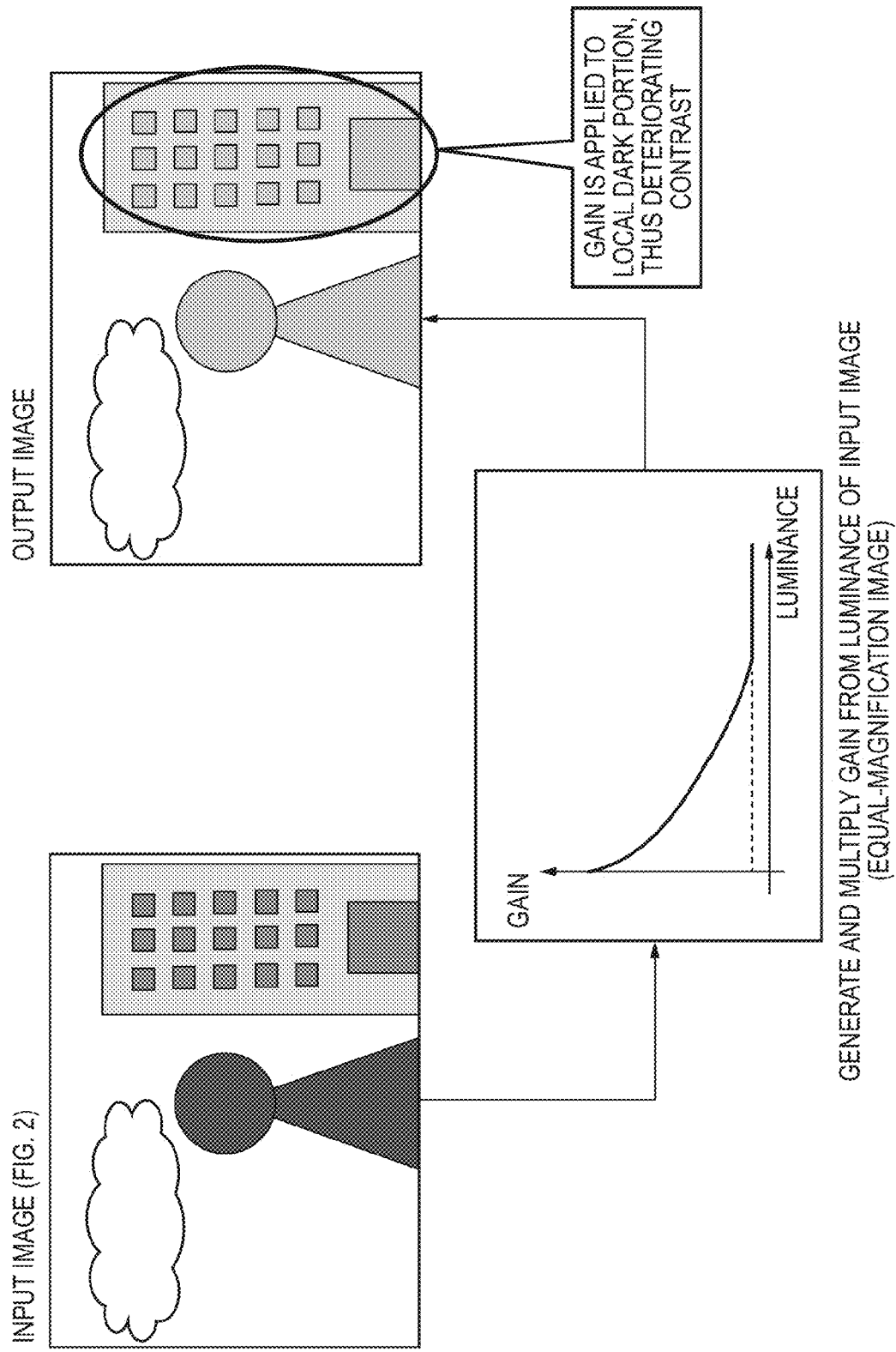
FIG. 4 is a view showing a contrast drop caused by the luminance-dependent gains.

A gain image generation unit 105 generates a gain by which an image is to be multiplied from the luminance-dependent gain table calculated by the luminance-dependent gain generation unit 103. Gain data, which is generated by the gain image generation unit 105 using the luminance-dependent gain table, and is mapped by associating gains with luminance values of respective pixels in an image, will be referred to as a gain image hereinafter. In this embodiment, an input image to the gain image generation unit 105 uses a luminance image generated from an image output from the signal processing unit 104, and the input image and an image, which is obtained by reducing the input image to leave only low-frequency components, are used in gain generation. The reason why a low-frequency image is used is to lower the gain sensitivity to fine details of an image, as described in the paragraphs of the related art. In the example shown in FIG. 2, a dark main object portion is controlled to be brighter, but when a large gain is applied to a locally dark portion of a building in a background, a luminance difference from the remaining portion of the building is reduced, thus impairing a contrast of the image (FIG. 4). Therefore, it is preferable to multiply fine textures such as windows of the building shown in FIG. 2 by a uniform gain according to a representative luminance value of the entire building. For this purpose, by generating the low-frequency image of the input image, since fine textures disappear to set nearly the same luminance value as a surrounding luminance value, nearly the same gain value need only be multiplied, thus maintaining the contrast. For the aforementioned reasons, this embodiment uses the low-frequency image of the input image.

Figure 5:
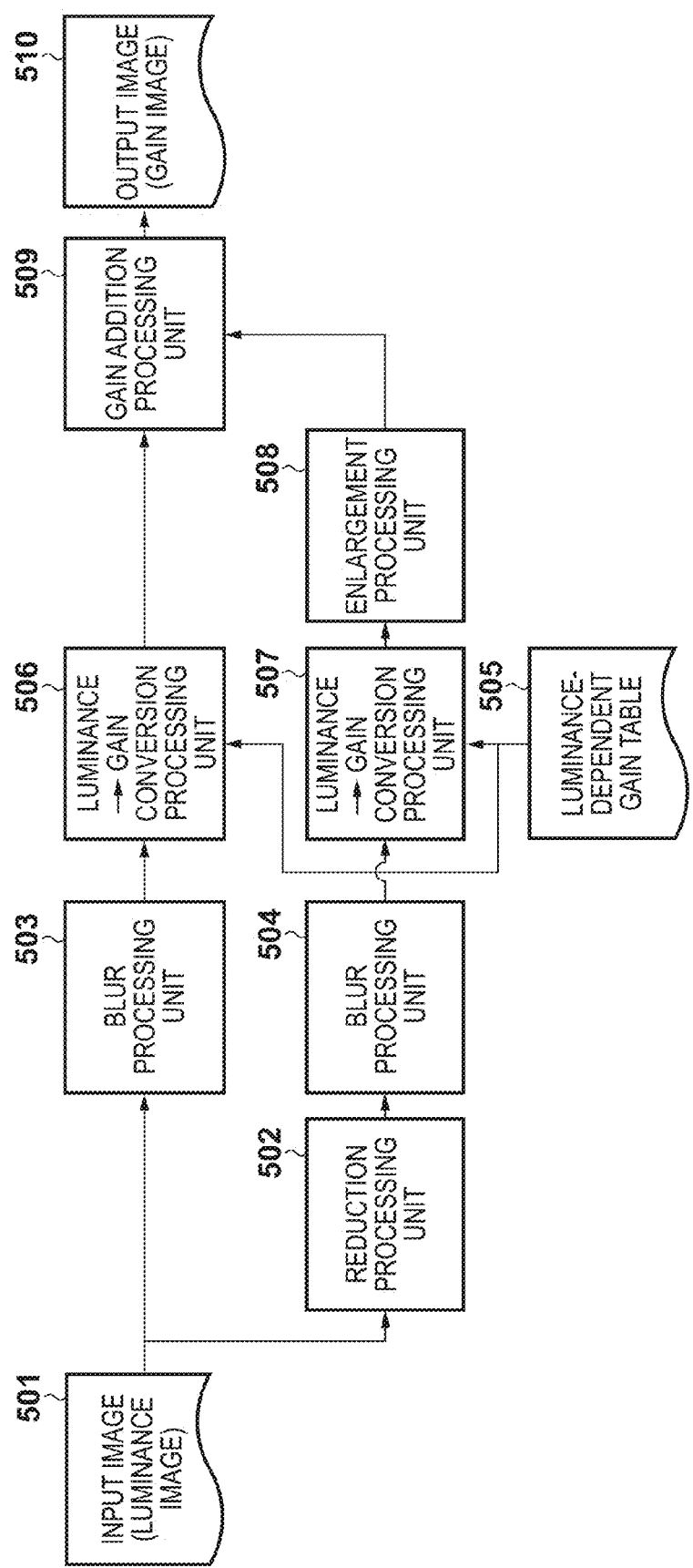
FIG. 5 is a block diagram of processes in a gain image generation unit according to the first embodiment.

FIG. 5 is a block diagram showing processes of the gain image generation unit 105. The processes of the gain image generation unit 105 will be described below with reference to FIG. 5.

An input image 501 is a luminance image generated from an image output from the signal processing unit 104. A reduction processing unit 502 (reduced image generation unit) reduces the input image 501. In this embodiment, a reduction ratio is not particularly limited, but it is desirably estimated from frequencies of fine texture portions to which a gain is to be uniformly applied. Also, a reduction method is not particularly limited.

<Blur Processing Unit 503>

Figure 25:
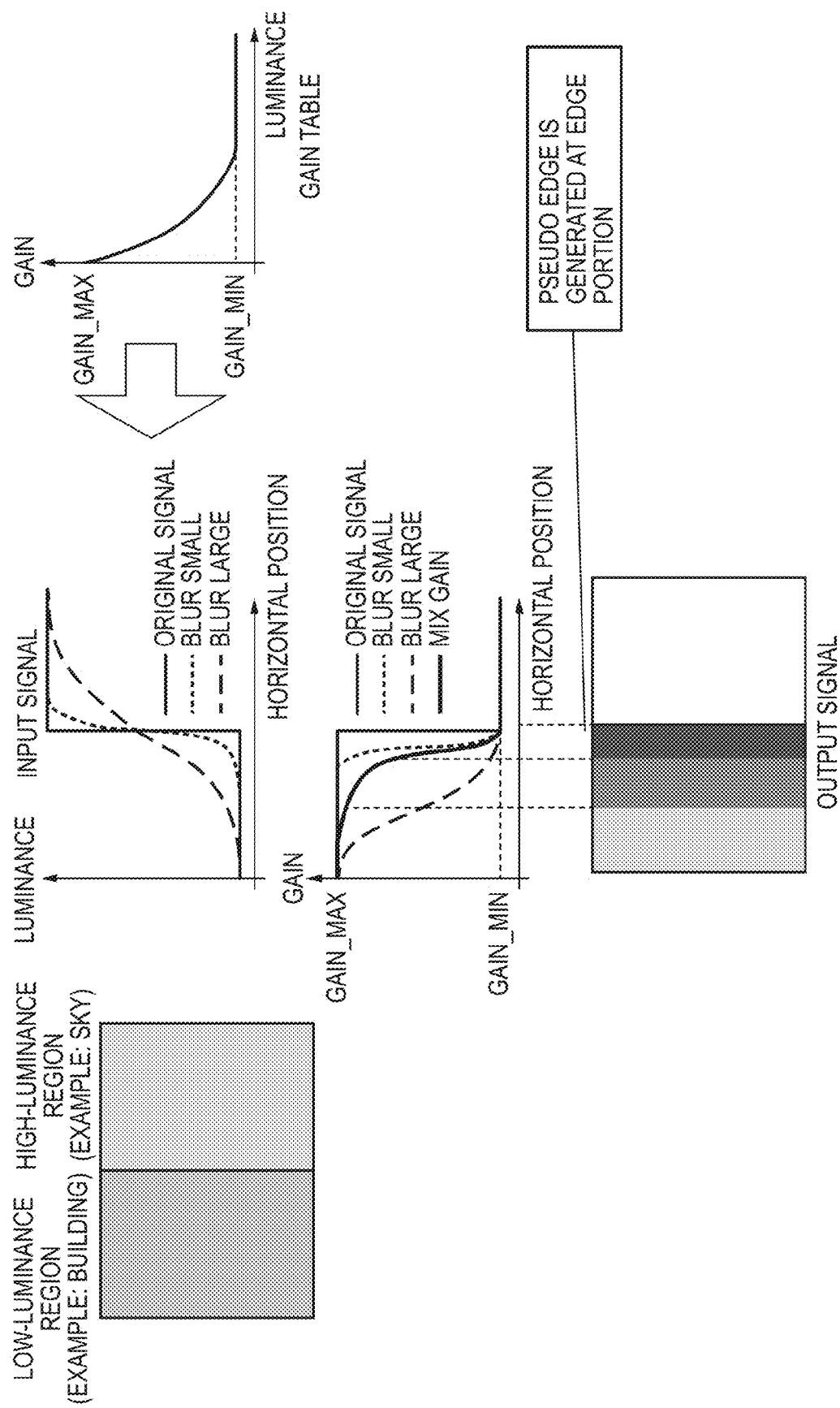
FIG. 25 is a view showing a problem (generation of a pseudo edge) of the related art.

Blur processing units 503 and 504 execute a predetermined blur process for the input image 501 and an output image of the reduction processing unit 502. The object of the blur process is to further lower the gain sensitivity to fine textures and to maintain the contrast more satisfactorily. On the other hand, for example, the blur process is preferably skipped for a boundary between the main object region and background region in FIG. 2. As one of reasons, a dodging process is desired to respectively multiply the main object region and background region by different gains. As another reason, since a luminance difference between the two regions is very large in the assumed backlight scene, if the blur process is applied to the boundary portion, a pseudo edge as the problem in FIG. 25 is generated conspicuously.

Therefore, it is required to apply the blur process while preserving an edge with a large luminance difference.

Figure 6:
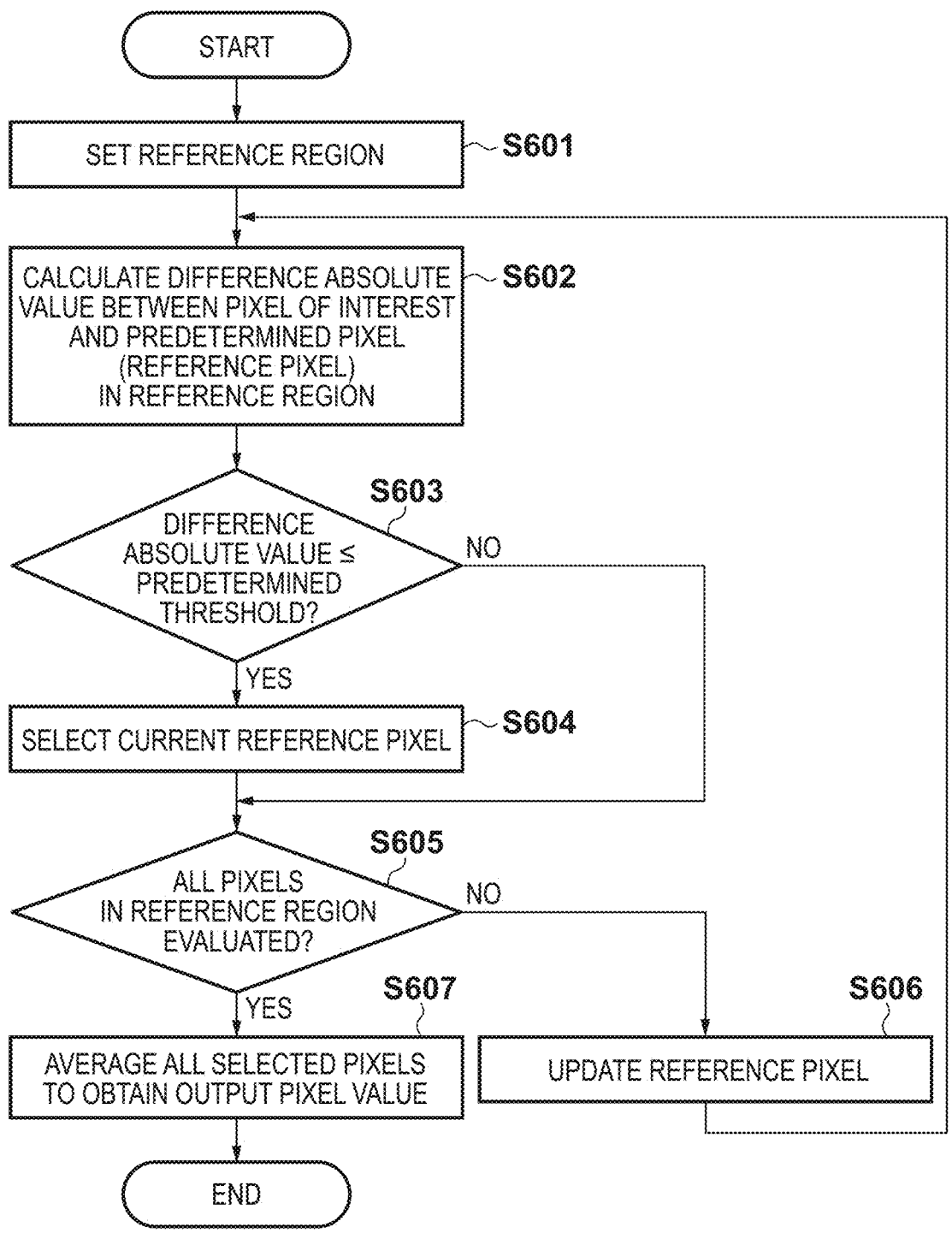
FIG. 6 is a flowchart showing processes in a blur processing unit.
Figure 7:
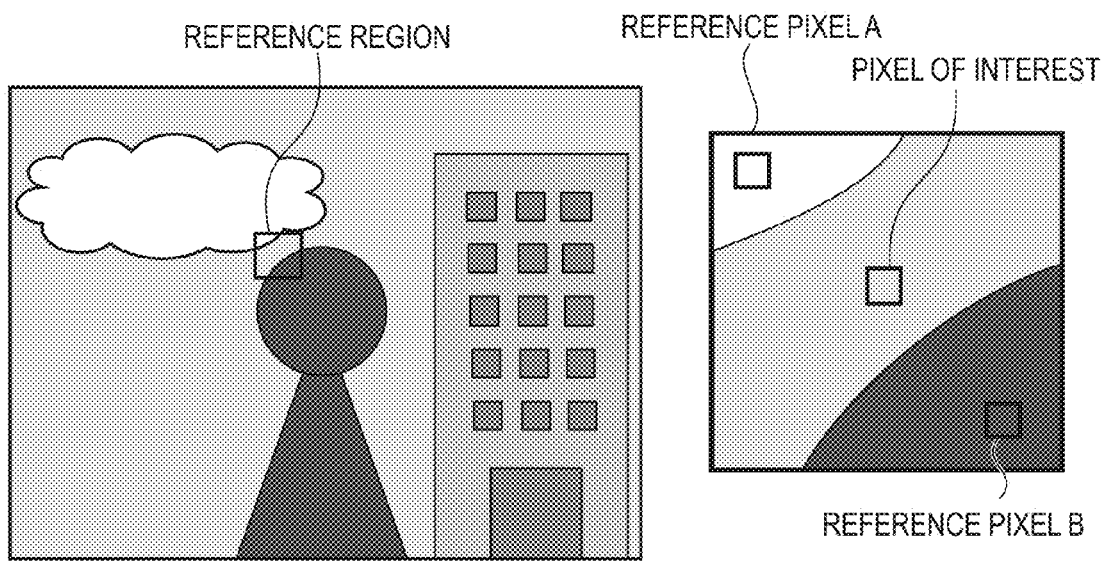
FIG. 7 is a view showing the process of the blur processing unit.

FIG. 6 is a flowchart showing the processes in the blur processing units 503 and 504, and FIG. 7 is a view showing the processing contents of the blur processing units 503 and 504.

As shown in FIG. 6, a reference region is set in step S601. In this embodiment, a set of pixels within a predetermined range from a position of a pixel to be processed (to be referred to as a pixel of interest hereinafter) in horizontal and vertical directions is defined as a reference region.

Next, in step S602, a predetermined pixel in the reference region is selected as a reference pixel, and a difference absolute value between the pixel of interest and reference pixel is calculated. Furthermore, it is determined in step S603 whether or not the difference absolute vale is not more than a predetermined threshold. In this embodiment, assume that the threshold is set according to the luminance value of the pixel of interest. This is because level differences of pixels to be selected are different in a low-luminance region and high-luminance region.

In step S604, the reference pixel, which is determined to have the difference absolute value not more than the threshold, is selected (extracted). In the example shown in FIG. 7, a reference pixel A located in a cloud portion in a background is selected, but a reference pixel B located in a person portion is not selected with respect to the pixel of interest. In this manner, only reference pixels having closer luminance levels are selected.

It is confirmed in steps S605 and S606 whether or not all pixels in the reference region have been evaluated. If pixels to be evaluated still remain, the processes of steps S602 to S604 are repeated while updating a reference pixel until all the pixels are evaluated. Finally, in step S607, an average value of all the selected pixels is calculated as an output pixel value.

The processes of the blur processing unit 503 have been described. The blur processing unit 503 can obtain an image which has undergone the blur process while preserving edges having large luminance differences.

Luminance→gain conversion processing units 506 and 507 respectively convert luminance images output from the blur processing units 503 and 504 into gain images using a luminance-dependent gain table 505 calculated by the luminance-dependent gain generation unit 103. That is, for a plurality of images which include a reduced image and have different reduction ratios, gain data are generated.

An enlargement processing unit 508 applies an enlargement process to a gain image which is converted from the reduced image by the luminance→gain conversion processing unit 507. In this case, the enlargement process enlarges an image to the same size as that of the input image. That is, when the reduction processing unit 502 executes reduction of 1/N times, the enlargement processing unit 508 executes an enlargement process of N times. Note that the method of the enlargement process is not particularly limited.

<Gain Addition Processing Unit 509>

A gain addition processing unit 509 adds a gain image (first gain data) obtained by converting input luminance values into gains and a gain image (second gain data) obtained by reducing input luminance values to relatively leave only low-frequency components. The respective images will be referred to as images of upper and lower layers.

When gain characteristics of the upper and lower layers are simply added and averaged, as shown in FIG. 25, a pseudo edge is unwantedly generated in the vicinity of an edge portion having a large luminance difference depending on the pattern of the gain table. Therefore, a method of the addition process has to be devised.

Figure 8:
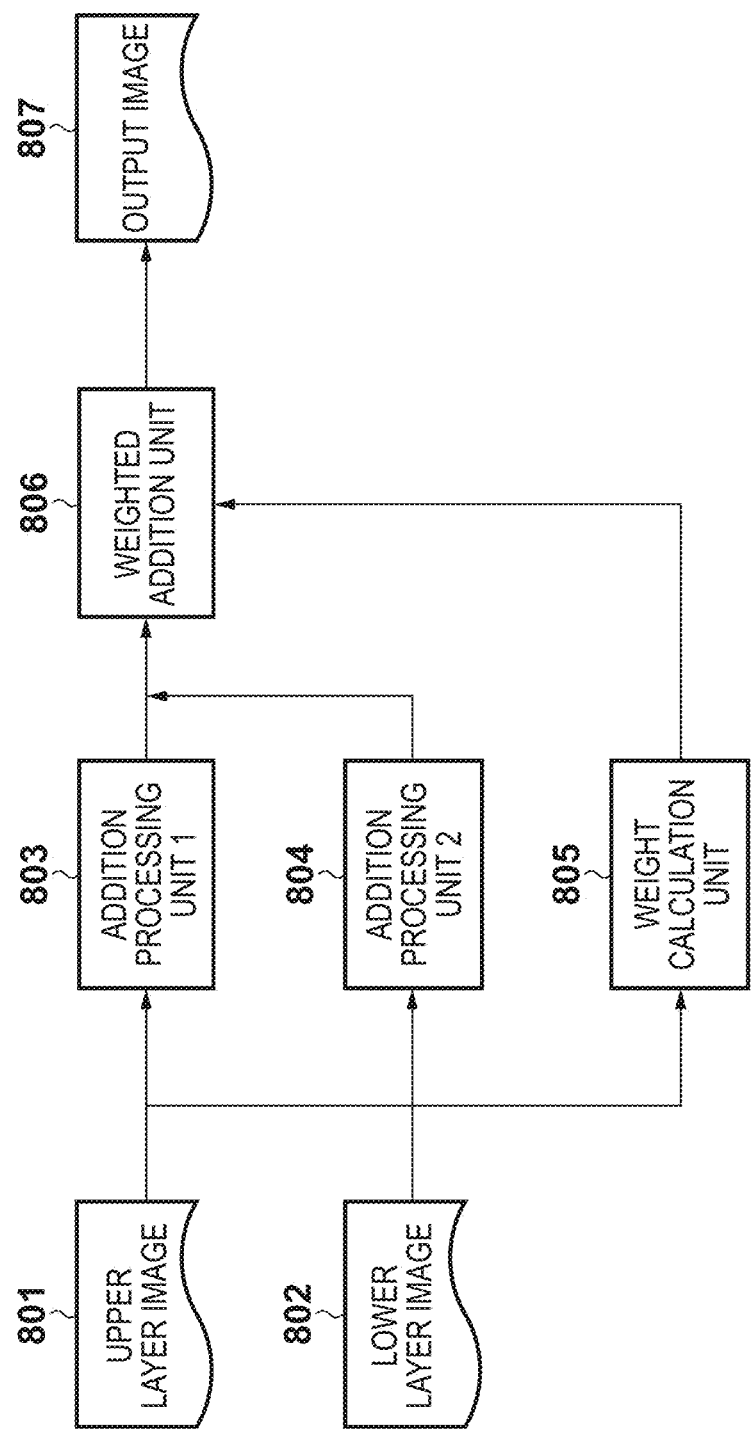
FIG. 8 is a block diagram showing processes of a gain addition processing unit.

FIG. 8 is a block diagram showing processes of the gain addition processing unit 509. The operation of the gain addition processing unit 509 will be described below with reference to FIG. 8.

Figure 9:
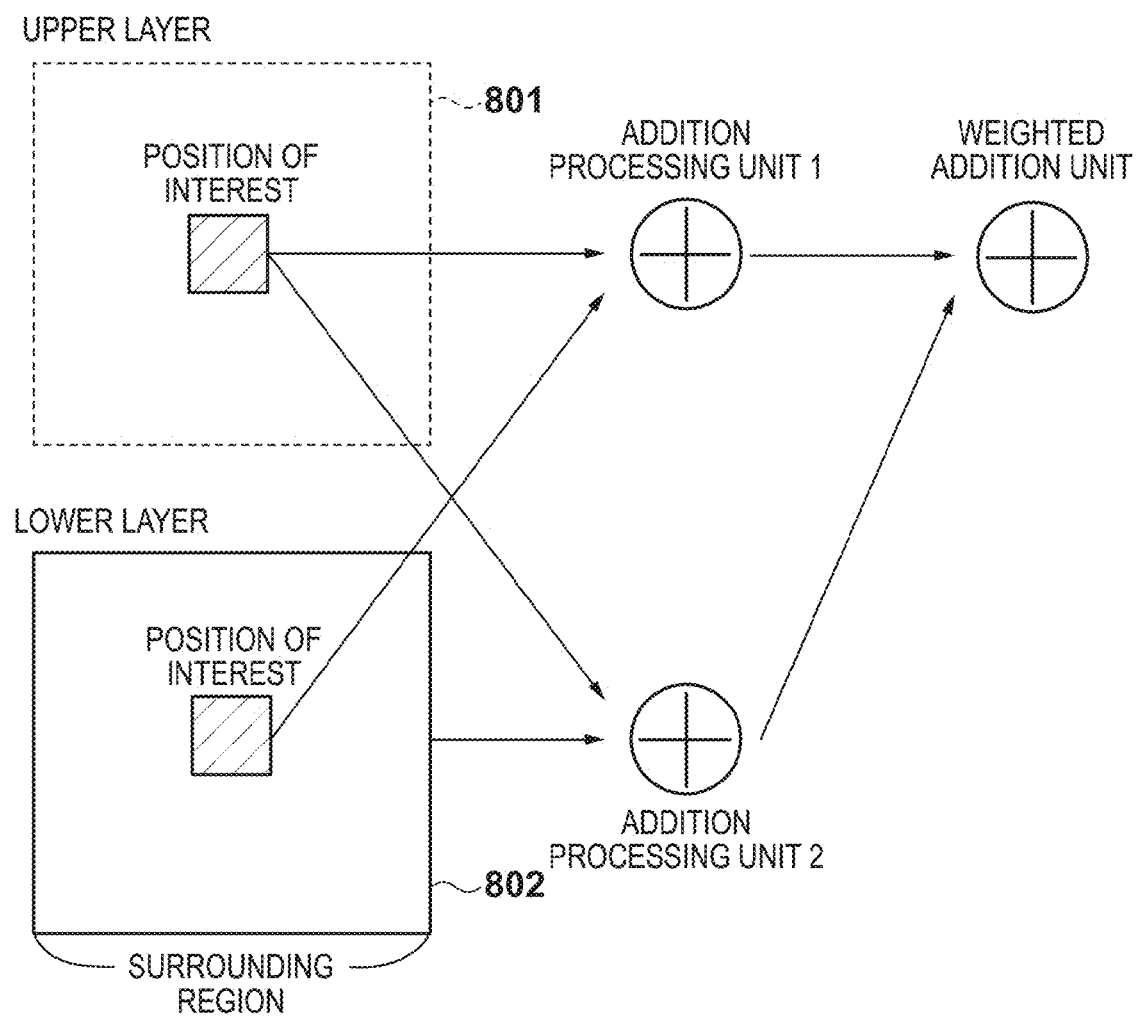
FIG. 9 is a view showing the processing contents of an addition processing unit 2.

Two types of addition processes are applied to an upper layer image 801 and lower layer image 802. FIG. 9 shows the addition process in the gain addition processing unit 509. As shown in FIG. 9, an addition processing unit 1 adds and averages gains at positions of interest (to be referred to as gains of interest hereinafter) of the upper and lower layers (first addition result).

The processing contents of an addition processing unit 2 will be described below. As shown in FIG. 9, addition processing unit 2 uses the gain of interest of the upper layer and that in a surrounding region (to be referred to as surrounding gains hereinafter) of the lower layer. Note that the surrounding region corresponds to a set of pixels within a predetermined range from the position of interest in upper, lower, and right, and left directions.

Figure 10:
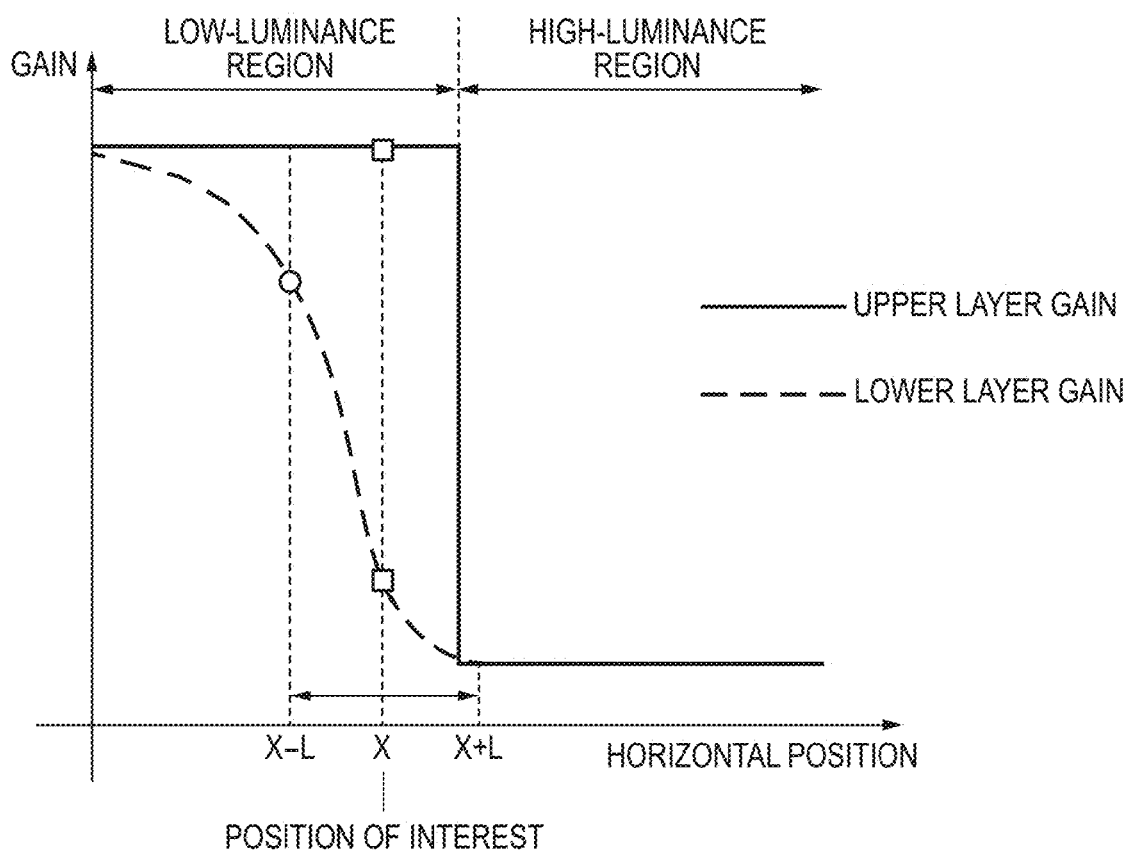
FIG. 10 is a graph showing the processing contents of the addition processing unit 2.

An object of the process to be executed by the addition processing unit 2 is to reduce a pseudo edge as the problem to be solved by the present invention. FIG. 10 shows, based on the same idea as in FIG. 25, patterns of upper and lower layer gains when a pseudo edge is generated near an edge portion, and a processing image of the addition processing unit 2. In the example shown in FIG. 10, a lower layer gain becomes extremely small near an edge portion having a large luminance difference. Therefore, when gains are added at a position X, if gains of interest expressed by squares are added to each other, the adverse effect of the pseudo edge is worsened. Therefore, as a lower layer gain, a range separated by L from the position X in the right and left directions is searched to select a gain having a value closest to the gain of interest of the upper layer in place of a gain at the position of interest. In the example shown in FIG. 10, using a gain at a position X-L expressed by a circle, the influence received from an extremely small gain of the lower layer can be reduced (second addition result). With the aforementioned addition process, generation of a pseudo edge caused by multiplying an extremely different gain near an edge portion can be suppressed.

Figure 11:
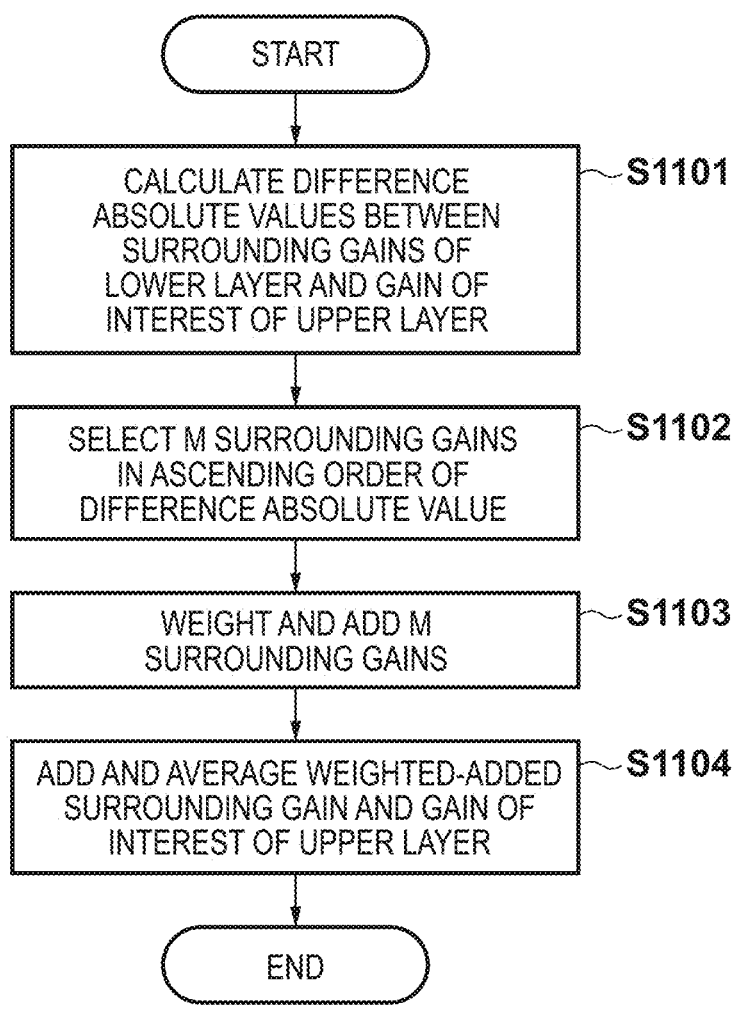
FIG. 11 is a flowchart showing the processing contents of the addition processing unit 2.

FIG. 10 describes the one-dimensional example for the sake of simplicity. However, in the actual process of the addition processing unit 2, the same process is executed two-dimensionally. FIG. 11 is a flowchart showing the processing contents of the addition processing unit 2.

In step S1101, difference absolute values between the gain of interest of the upper layer and respective surrounding gains (gains of surrounding pixels) of the lower layer are calculated. Then, in step S1102, M surrounding gains are selected in ascending order of absolute difference value. Note that M is a predetermined value. With this process, as shown in FIG. 10, surrounding gains of the lower layer, which have gain values closer to the gain of interest of the upper layer, can be selected. Note that this embodiment adopts the method of selecting the predetermined number of gains in ascending order of difference absolute value. Especially, the process for sorting values in ascending order requires a large arithmetic scale and large circuit scale at the time of circuit implementation. Therefore, other methods (for example, a method of selecting all gains corresponding to difference absolute values not more than a predetermined threshold) may be adopted.

In step S1103, the selected M surrounding gains are weighted and added. A weight (coefficient) used in a weighted addition is determined by:

$$W(k) = \frac{A}{|GL(k) - GH|} \quad (1)$$

where GL(k) indicates a k-th gain of the selected surrounding gains of the lower layer, and W(k) indicates a corresponding weight of weighted addition. Also, GH indicates the gain of interest of the upper layer, and A is a predetermined constant. As can be seen from equation (1), a weight becomes larger as a difference from the gain of interest of the upper layer is smaller.

Furthermore, after the weights W(k) for the respective surrounding gains are calculated using equation (1), the weighted addition is executed by:

$$GL' = \frac{\sum_{k=1}^{M}\{W(k) \times GL(k)\}}{\sum_{k=1}^{M} W(k)} \quad (2)$$

where GL' is a lower layer gain after the weighted addition.

Finally, in step S1104, the weighted and added surrounding gain GL' of the lower layer and the gain GH of interest of the upper layer are added and averaged. The added and averaged gain value is output from the addition processing unit 2.

Figure 12:
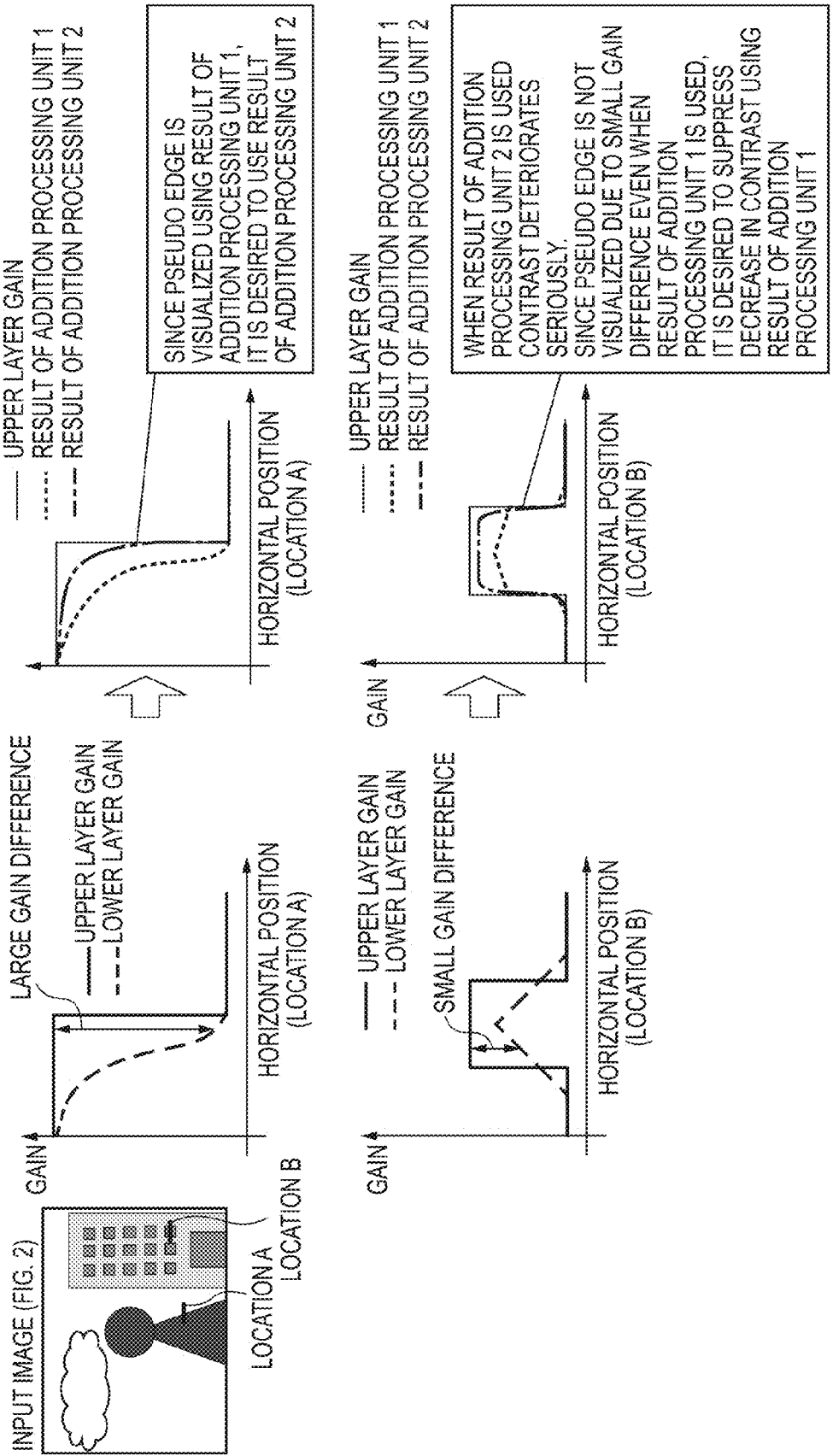
FIG. 12 is a view showing advantages of an addition processing unit 1 and the addition processing unit 2.

The operation of the addition processing unit 2 required to reduce a pseudo edge has been described. However, when this addition method is applied to the entire image, a gain pattern unwantedly approaches that of the upper layer, and is consequently sensitive to textures, thus deteriorating the contrast of the output image. For example, it is desirable to suppress a pseudo edge using the result of the addition processing unit 2 in the vicinity of an edge portion having a large luminance difference and large gain difference like a location A, as shown in FIG. 12. However, when the result of the addition processing unit 2 is used for a texture portion having a small gain difference like a location B, the contrast of an image unwantedly decreases. When a gain difference is smaller, a pseudo edge is not visualized. Hence, in the location B, a decrease in contrast is desirably suppressed using the result of the addition processing unit 1.

Based on the above examination, a final addition result is obtained by weighting and adding the result of the addition processing unit 1 and that of the addition processing unit 2, and a weight used at that time is preferably determined by a gain difference of the upper and lower layers at the position of interest. Therefore, the results of the addition processing units 1 and 2 are weighed and added by a weighted addition unit 806, and a weight used at that time is calculated by a weight calculation unit 805. As described above, the weight of the weighted addition is determined by a difference value of the gains of interest of the upper and lower layers, and is set to attach more importance to the result of the addition processing unit 2 as the difference value is larger.

The processing contents of the gain addition processing unit 509 have been described. An output image 807 is a gain image 510 as a final output of the gain addition processing unit 509, and is similarly a final output of the gain image generation unit 105.

A gain multiplying unit 106 multiplies an original image, which has undergone the predetermined signal processes in the signal processing unit 104, by the final gain image (control gain) generated by the gain image generation unit 105. The output from the gain multiplying unit 106 undergoes tone compression to a predetermined output range by a tone compression unit 107. Note that the compression method includes a gamma conversion process and the like.

Finally, the image which has undergone tone compression by the tone compression unit 107 is output to an image display unit 108 and image recording unit 109.

As described above, according to the processes of this embodiment, when upper and lower layer images are added, gain values, which are closer to the gain of interest of the upper layer, are selected from surrounding gains of the lower layer, and are added, thus suppressing an adverse effect of a pseudo edge caused by use of a low-frequency image.

Also, based on a gain difference at the position of interest, (1) the addition result 1 which prioritizes contrast maintenance and (2) the addition result 2 which prioritizes pseudo tone suppression are weighted and added, thus suppressing a decrease in contrast and pseudo tones.

In this embodiment, images having two types of frequency bands are generated from the input image in the gain addition process. However, the present invention is not limited to this. For example, images having three or more (two types or more of) different frequency bands may be generated, and may sequentially undergo the addition process.

(Second Embodiment)

Figure 13:
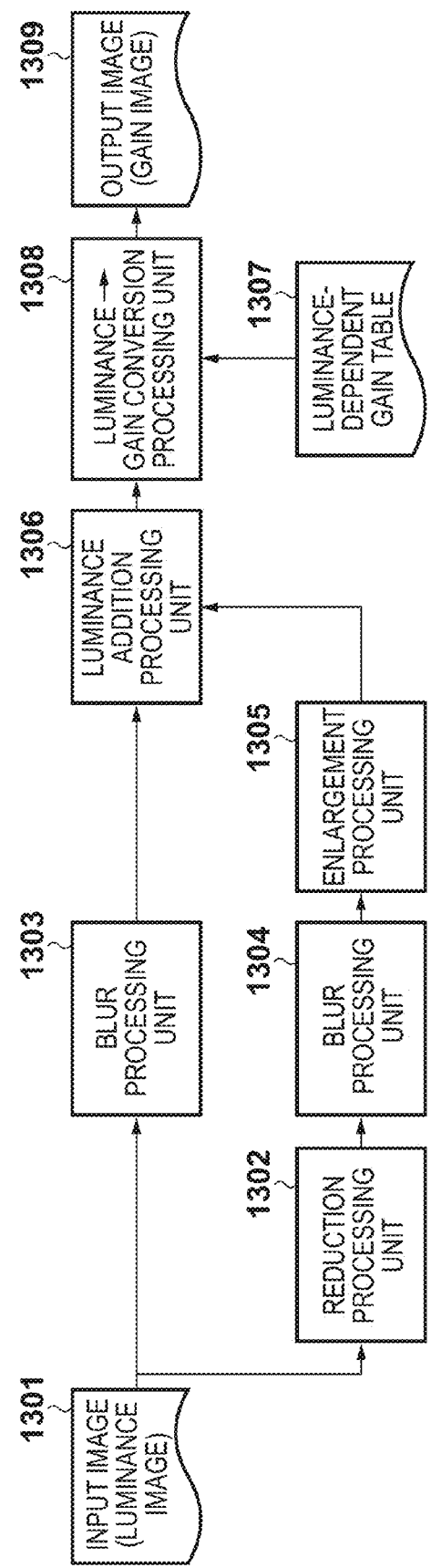
FIG. 13 is a block diagram showing processes of a gain image generation unit according to the second embodiment.

The second embodiment has different processing contents of the gain image generation unit 105 shown in FIG. 1 compared to the first embodiment. FIG. 13 is a block diagram showing processes of the gain image generation unit 105 according to the second embodiment. As shown in FIG. 13, in this embodiment, luminance images undergo an addition process (image addition), and a luminance-dependent gain table is applied to the added luminance image, thus generating a gain image as an output.

Advantages of this arrangement include a reduction of an arithmetic scale since only one conversion processing unit which converts luminance values into gains is required, and a reduction of a circuit scale upon circuit implementation of the conversion process. In this embodiment, two types of images having different frequency bands are generated from an input image, and are added. Alternatively, three or more images having different frequency bands may be generated. In this case, in consideration of the processing of the first embodiment, luminance→gain conversion processing units as many as the number of images to be generated are required. Therefore, the effects of this embodiment become greater as the number of images to be generated increases.

Figure 14:
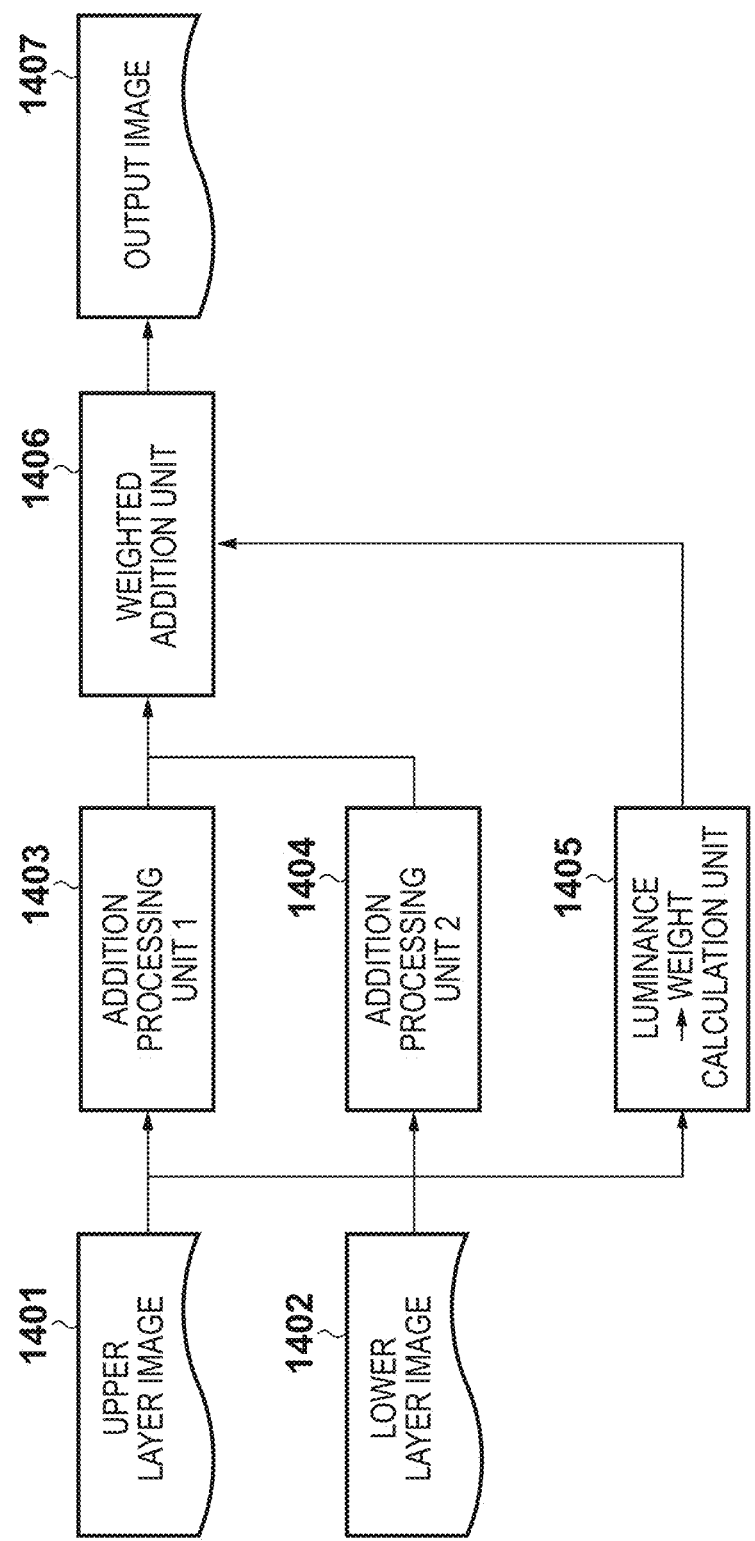
FIG. 14 is a block diagram showing processes of a luminance addition processing unit.

In FIG. 13, a unit having different processing contents from FIG. 5 of the first embodiment is a luminance addition processing unit 1306. The processing contents of the luminance addition processing unit 1306 and, especially, a luminance→weight calculation unit 1405 shown in FIG. 14, will be described below.

In the weight setting method in the weight calculation unit 805 of the first embodiment, a weight for the output result of the addition processing unit 2 is increased as a gain difference value from a gain of interest of an upper layer becomes larger. On the other hand, the luminance→weight calculation unit 1405 of this embodiment calculates a weight based on a luminance difference between an upper layer (first image) and lower layer (second image) in place of a gain difference. Therefore, as shown in FIG. 15, even when nearly equal luminance differences are generated, gain differences are different depending on luminance values, as shown in FIG. 15. In the example of FIG. 15, although luminance differences are nearly equal to each other during zones A to C, but gain differences are different. Therefore, whether to prioritize an addition process 1 (addition of pixel values of pixels of interest) or an addition process 2 is different even for an identical luminance difference. Hence, upon calculation of a weight, a process which takes a gain difference value into consideration based on a luminance difference value has to be executed. In order to enhance the aforementioned effect (reduction of the arithmetic scale), this process is required to be executed by an arrangement as simple as possible. Note that the addition process 2 of this embodiment is executed by the same method as in the addition process 2 of the first embodiment, and this process is applied to a luminance image in this embodiment in place of a gain image in the first embodiment.

Figure 16:
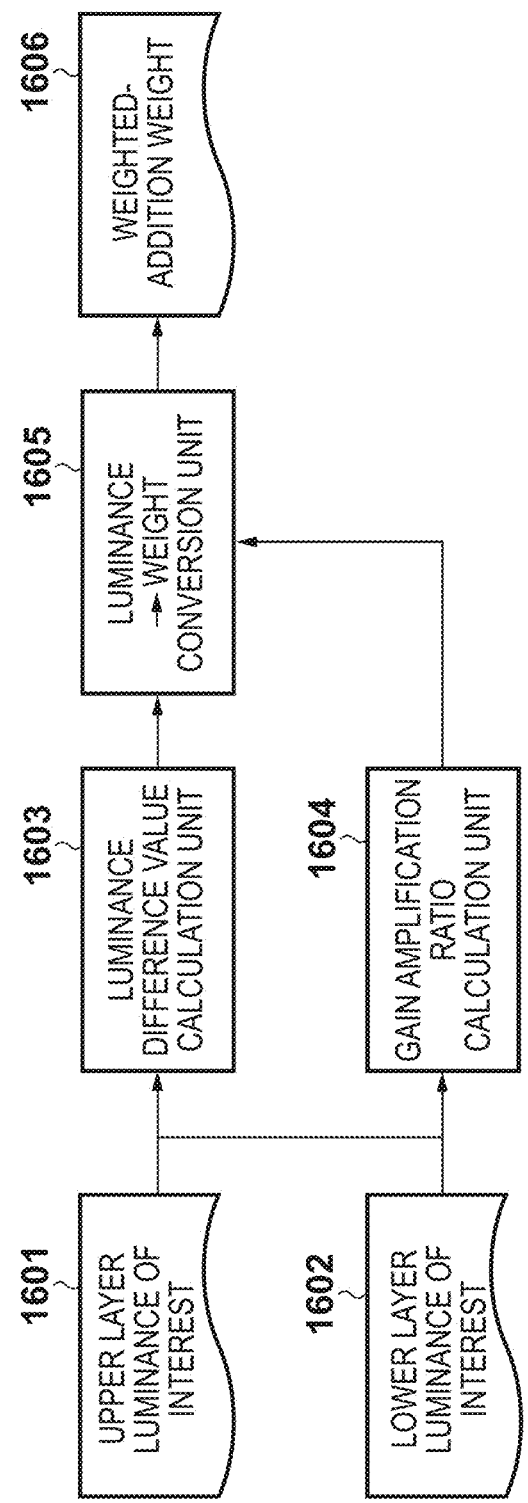
FIG. 16 is a block diagram showing operations of a luminance→weight calculation unit.

FIG. 16 is a block diagram showing the operation of the luminance→weight calculation unit 1405. Inputs are luminance values at positions of interest (to be referred to as luminance values of interest hereinafter) of upper and lower layers. Initially, a luminance difference value calculation unit 1603 calculates a difference absolute value of the luminance values.

<Gain Amplification Ratio Calculation Unit 1604>

As described above, even when luminance difference values are the same, gain difference value may be largely changed depending on a pattern of a gain table. A gain amplification ratio calculation unit 1604 calculates a gain amplification ratio as a value to be multiplied by a difference absolute value of luminance values so as to absorb this influence.

Figure 17:
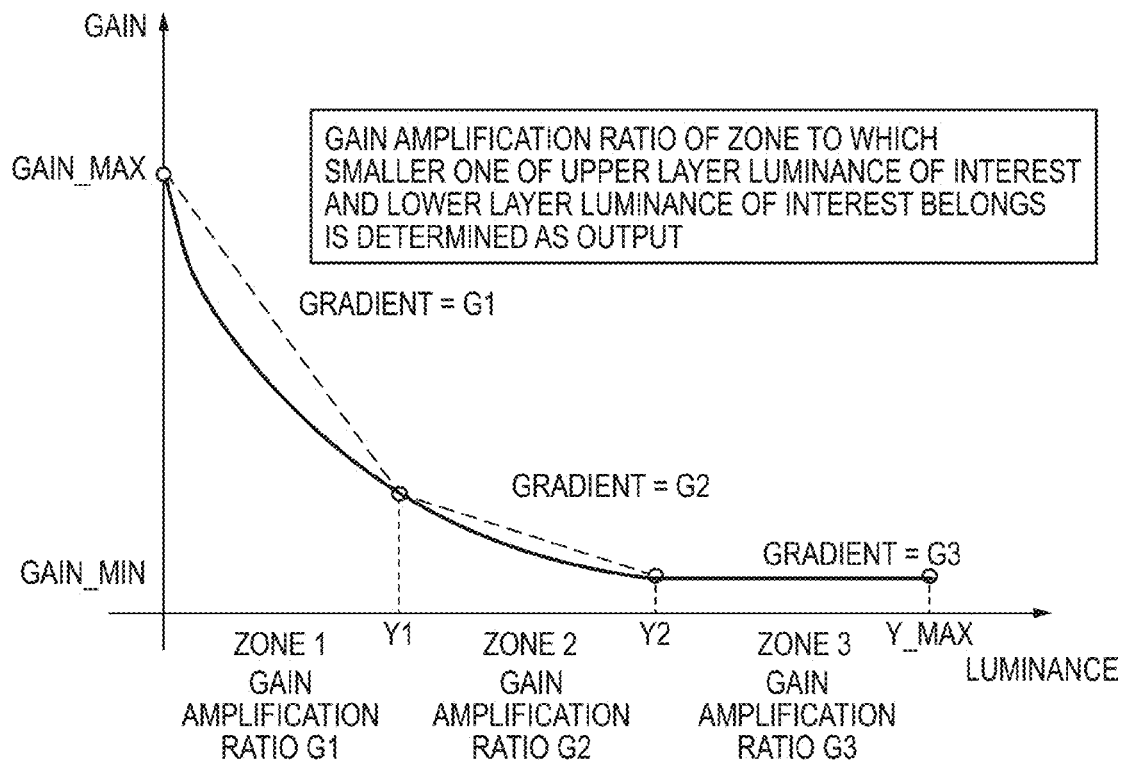
FIG. 17 is a graph showing a calculation of a gain amplification ratio.

FIG. 17 shows calculations of gain amplification ratios. As shown in FIG. 17, the luminance-dependent gain table is divided into predetermined luminance zones, and a gradient of gain values at start and end points of each zone is calculated. In the example shown in FIG. 17, a luminance range is divided into three zones, and gain amplification ratios G1, G2, and G3 are calculated. Furthermore, a gain amplification ratio of a zone, to which a smaller luminance value of input luminance values of interest of the upper and lower layers belongs, is adopted as an output of the gain amplification ratio calculation unit 1604.

Figure 18:
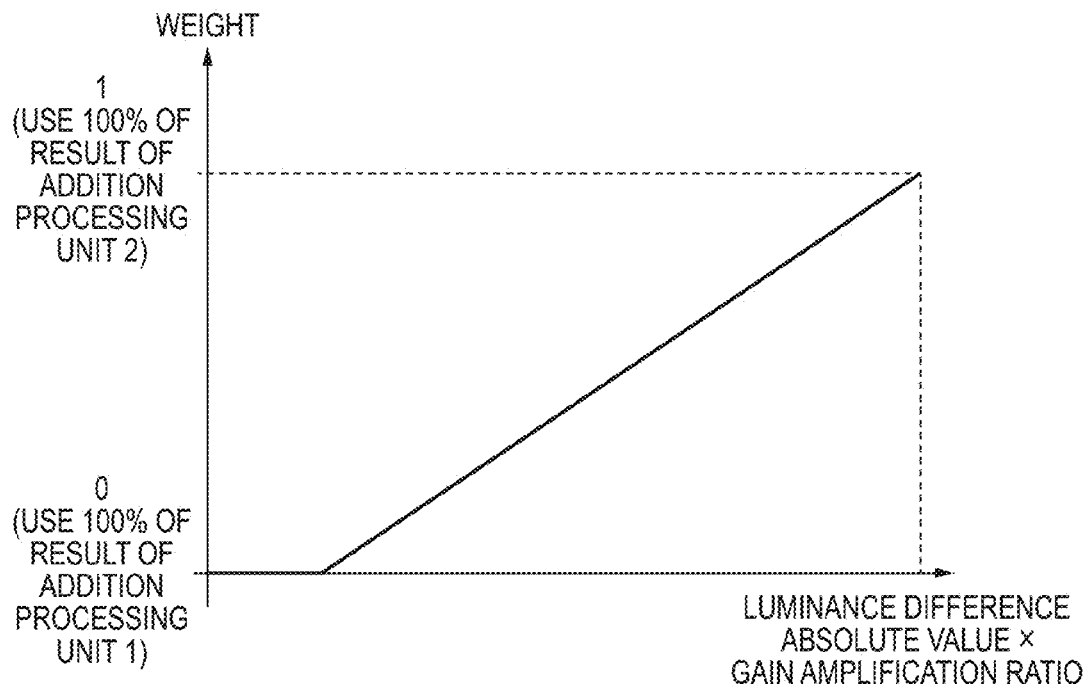
FIG. 18 is a graph showing an operation of a luminance→weight conversion unit.

FIG. 18 shows the operation of a luminance→weight conversion unit 1605. As shown in FIG. 18, an input of a weight table is a product of a luminance difference value and gain amplification ratio. A weight value with respect to an input value is desirably set to use the result of the addition processing unit 2 as the input value becomes larger.

The weight calculated by the aforementioned process is an output of the luminance→weight calculation unit 1405, and the addition results of the addition processing units 1 and 2 are weighted and added by an weighted addition unit 1406 using this weight, thus obtaining an output image.

The processes of the second embodiment, which are different from those of the first embodiment, have been described, and other processes are the same as those of the first embodiment.

(Third Embodiment)

Figure 19:
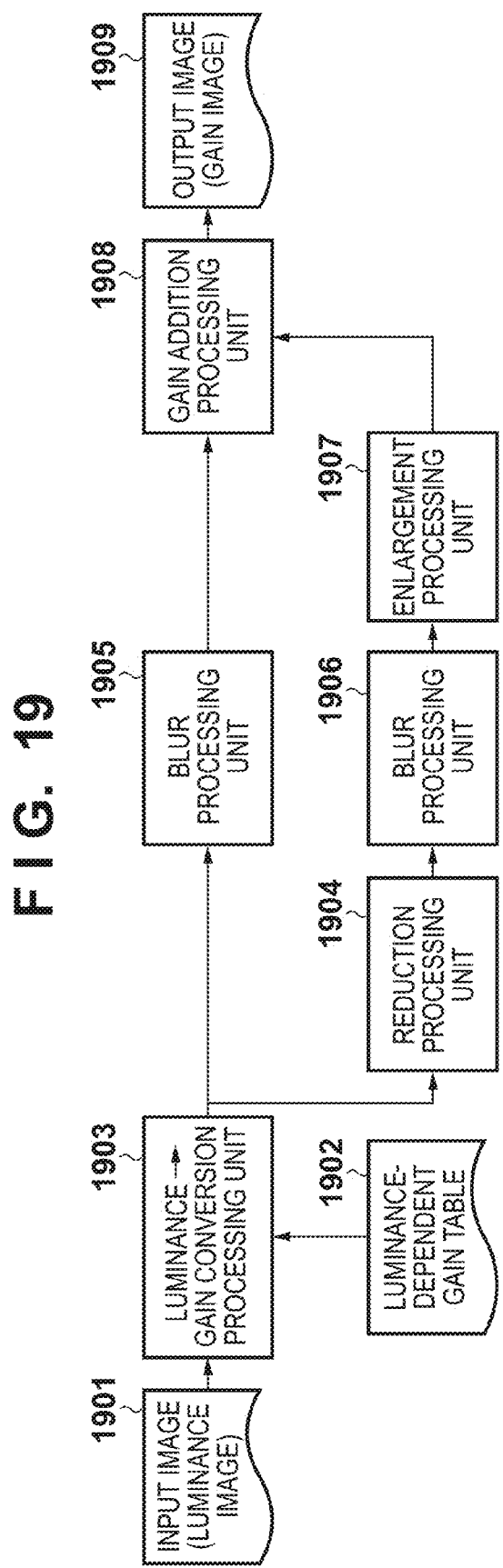
FIG. 19 is a block diagram showing processes of a gain image generation unit according to the third embodiment.

The third embodiment has different processing contents of the gain image generation unit 105 shown in FIG. 1 compared to the first embodiment. FIG. 19 is a block diagram showing processes of the gain image generation unit 105 according to the third embodiment. As shown in FIG. 19, in this embodiment, gain conversion of an input luminance image is executed first, and subsequent processes are then executed. That is, a reduction processing unit 1904 generates reduced data from gain data generated by a luminance→gain conversion processing unit 1903, thus obtaining reduced gain data.

Advantages of this arrangement include a reduction of an arithmetic scale since only one conversion processing unit which converts luminance values into gains is required, and a reduction of a circuit scale upon circuit implementation of the conversion process as in the second embodiment.

In FIG. 19, units having different processing contents from FIG. 5 of the first embodiment are blur processing units 1905 and 1906. An object of a blur process is to lower gain sensitivity caused by fine textures while holding an edge of, for example, a boundary portion between a main object and background, as described in the first embodiment. In order to achieve this object by a gain image input in place of a luminance image input, a process which takes a luminance difference value into consideration based on a gain difference value, and compensates for this influence is required based on the same idea as the gain amplification ratio of the second embodiment.

Figure 20:
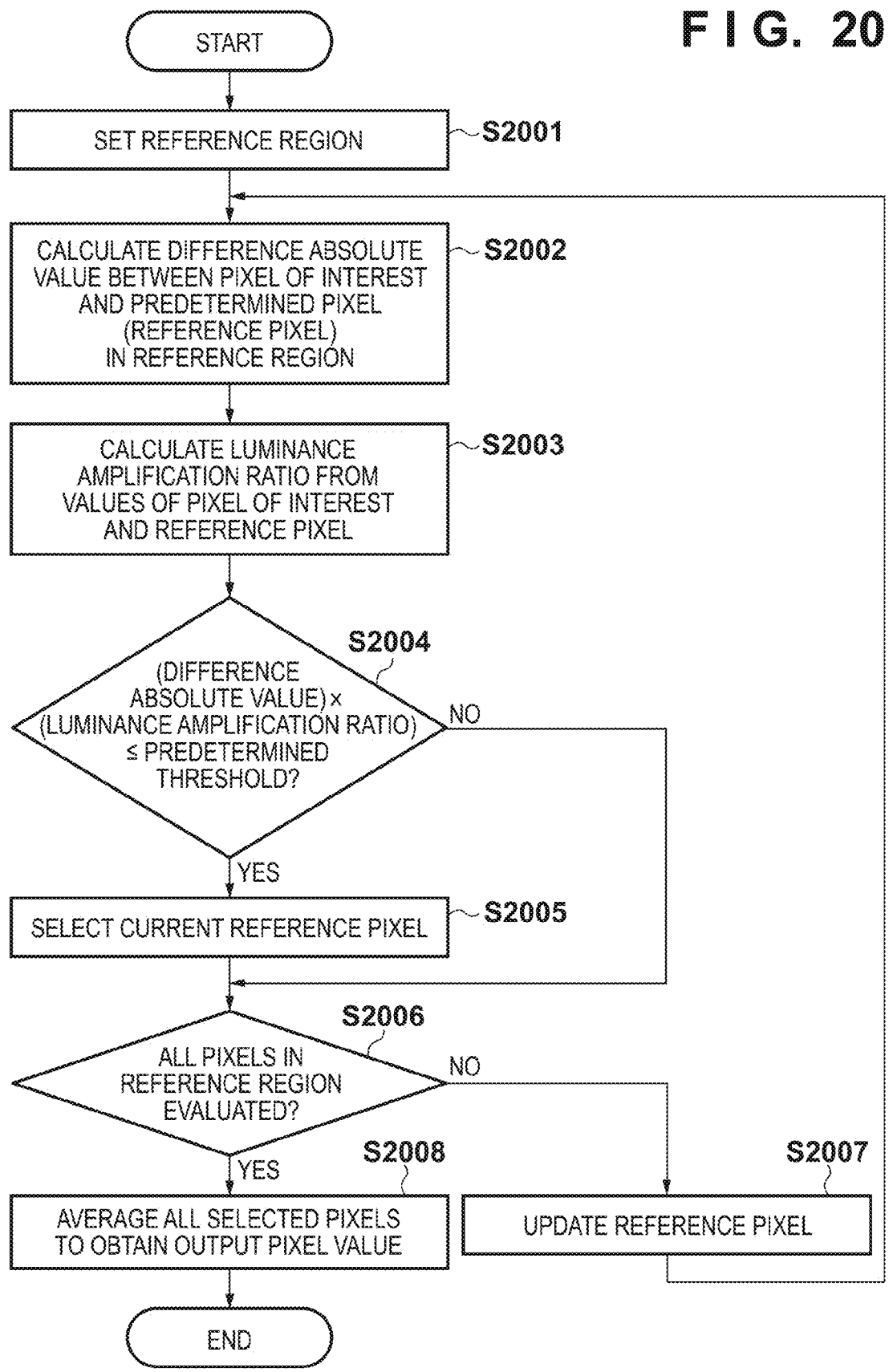
FIG. 20 is a flowchart showing the sequence of blur processing according to the third embodiment.

FIG. 20 is a flowchart showing the sequence of the blur process shown in FIG. 19. Processes different from the blur process of the first embodiment are steps S2003 and S2004. In step S2003, a luminance amplification ratio is calculated based on values of a pixel of interest and reference pixel. Note that "pixel value" described in FIG. 20 indicates "gain value".

Figure 21:
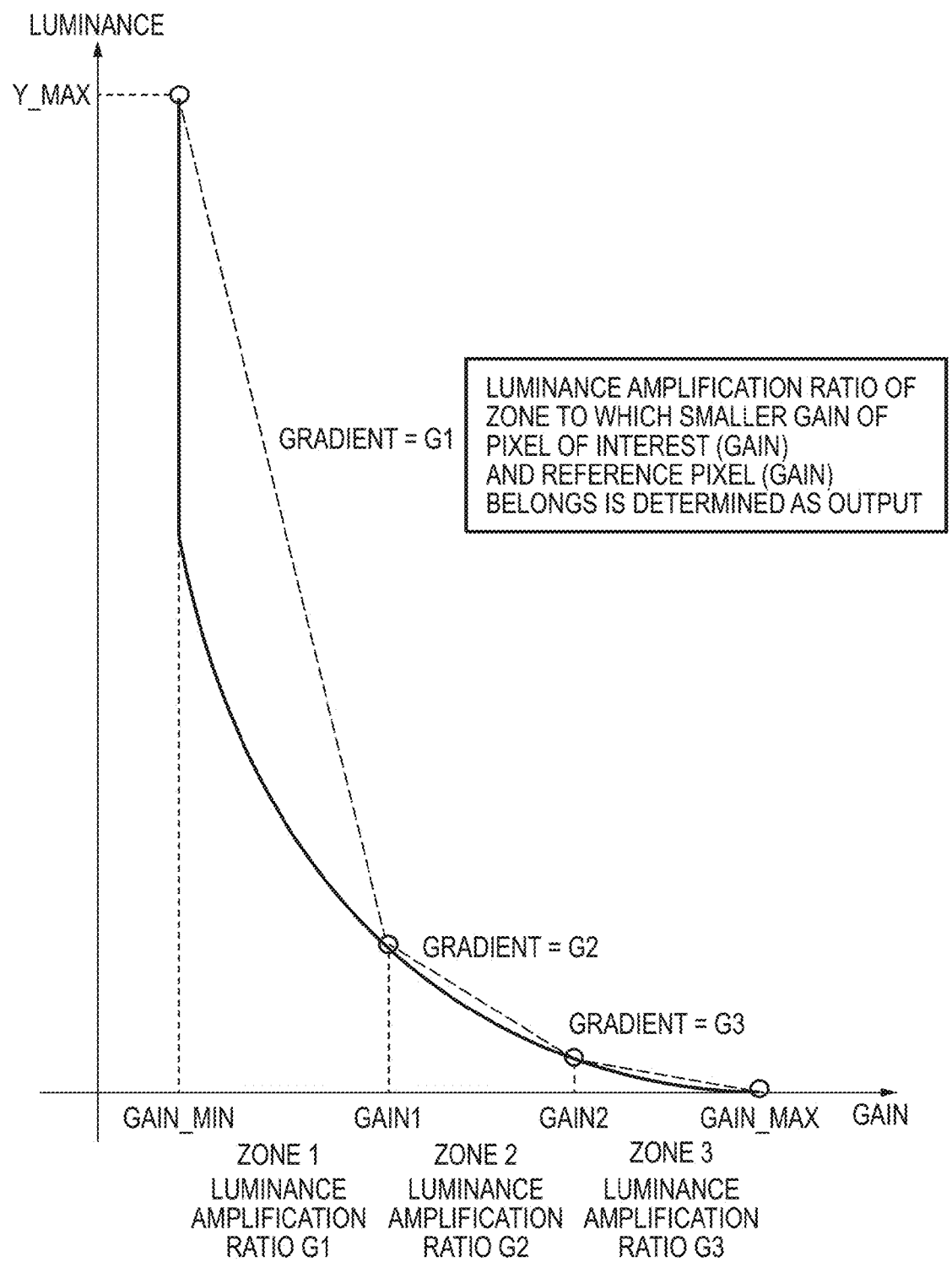
FIG. 21 is a graph showing a calculation of a luminance amplification ratio.

FIG. 21 shows calculations of luminance amplification ratios. As shown in FIG. 21, a luminance-dependent gain table is divided into predetermined zones to have a luminance value as an input, and a gradient of luminance values at start and end points of each zone is calculated. Furthermore, a luminance amplification ratio of a zone, to which a smaller gain value of those of the input pixel of interest and reference pixel belongs, is adopted as an output.

Next, it is confirmed in step S2004 whether or not a product of the luminance amplification ratio and gain difference absolute value is not more than a predetermined threshold. If the product is not more than the threshold, the current reference pixel value is selected. The subsequent processes are the same as those of the blur process of the first embodiment.

After that, images which have undergone the aforementioned blur process are added by a gain addition processing unit 1908, thus obtaining a gain image as a final output.

The processes of the third embodiment, which are different from those of the first embodiment, have been described, and other processes are the same as those of the first embodiment.

(Fourth Embodiment)

Figure 22:
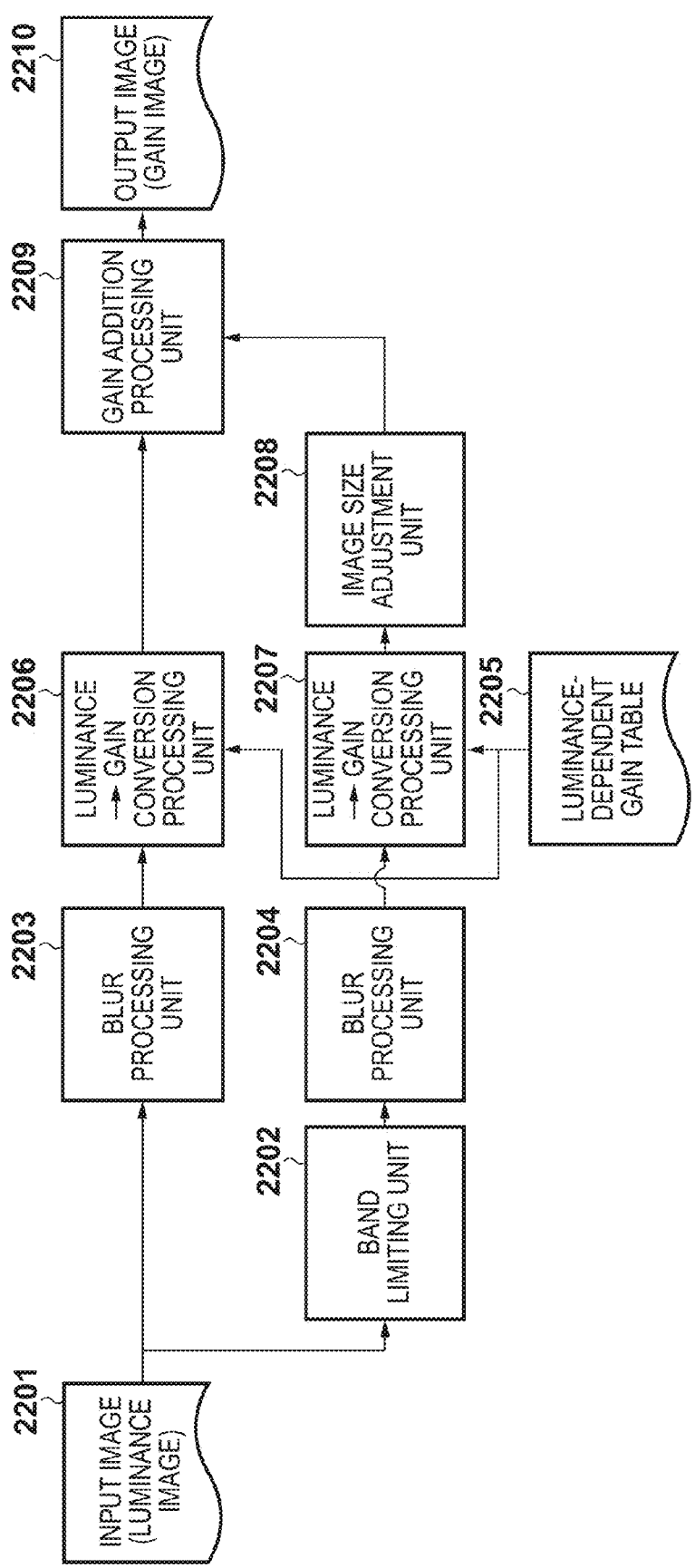
FIG. 22 is a block diagram showing processes of a gain image generation unit according to the fourth embodiment.

The fourth embodiment has different processing contents of the gain image generation unit 105 shown in FIG. 1 compared to the first embodiment. FIG. 22 is a block diagram showing processes of the gain image generation unit 105 according to the fourth embodiment.

As shown in FIG. 22, compared to the block diagram shown in FIG. 5, a unit corresponding to the reduction processing unit 502 is replaced by a band limiting unit 2202 (band-limited image generation unit), and the enlargement processing unit is replaced by an image size adjustment unit 2208. Originally, the process to be executed by the gain image generation unit 105 is to generate a plurality of images having desired frequency bands. The reason why the first embodiment uses the method of reduction and enlargement of images is to mainly attain a reduction of an arithmetic scale. In this embodiment, a band limitation method in the band limiting unit 2202 is not particularly limited. For example, a method of using a low-pass filter having desired frequency characteristics may be used.

Also, the image size adjustment unit 2208 executes a process for adjusting a size of an image to be input to a gain addition processing unit of the subsequent stage to that of an input image. Therefore, when the band limiting unit 2202 has executed a process including image size conversion, the image size adjustment unit 2208 executes an enlargement/reduction process for adjusting the size of an image to an input image size. Note that when the band limiting unit 2202 does not change an image size, the image size adjustment unit 2208 skips the process.

The processes of the fourth embodiment, which are different from those of the first embodiment, have been described, and other processes are the same as those of the first embodiment.

(Fifth Embodiment)

Figure 23:
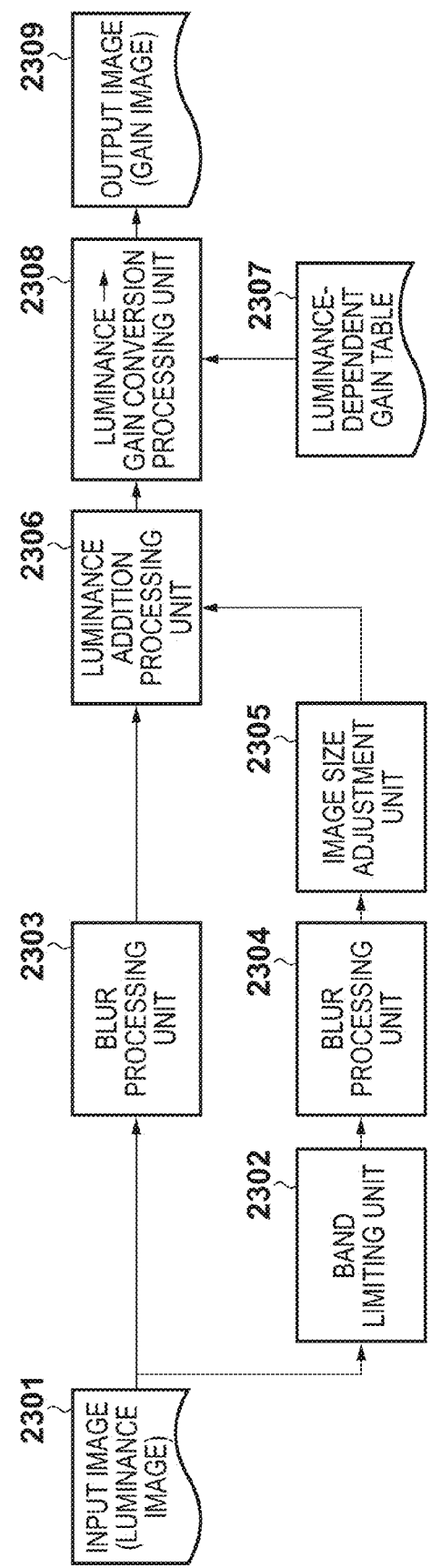
FIG. 23 is a block diagram showing processes of a gain image generation unit according to the fifth embodiment.

The fifth embodiment has different processing contents of the gain image generation unit 105 shown in FIG. 1 compared to the second embodiment. FIG. 23 is a block diagram showing processes of the gain image generation unit 105 according to the fifth embodiment.

As shown in FIG. 23, compared to the block diagram shown in FIG. 13, a unit corresponding to the reduction processing unit 1302 is replaced by a band limiting unit 2302, and the enlargement processing unit 1305 is replaced by an image size adjustment unit 2305. Note that since these units are the same as the contents of the fourth embodiment, a description thereof will not be repeated.

The processes of the fifth embodiment, which are different from those of the second embodiment, have been described, and other processes are the same as those of the second embodiment.

(Sixth Embodiment)

Figure 24:
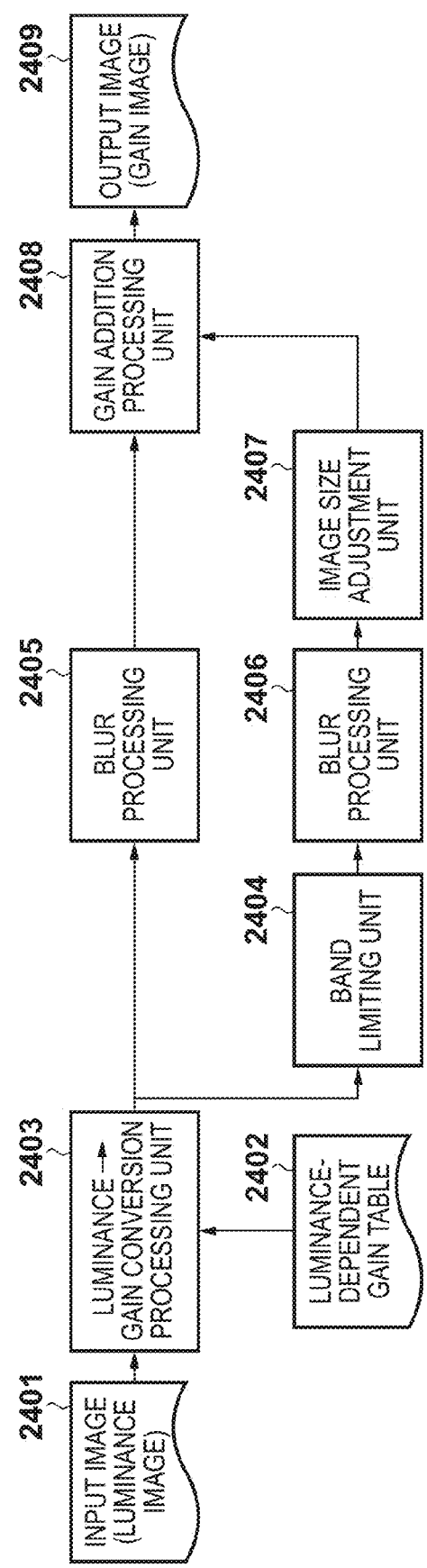
FIG. 24 is a block diagram showing processes of a gain image generation unit according to the sixth embodiment.

The sixth embodiment has different processing contents of the gain image generation unit 105 shown in FIG. 1 compared to the third embodiment. FIG. 24 is a block diagram showing processes of the gain image generation unit 105 according to the sixth embodiment.

As shown in FIG. 24, compared to the block diagram shown in FIG. 19, a unit corresponding to the reduction processing unit 1904 is replaced by a band limiting unit 2404, and the enlargement processing unit 1907 is replaced by an image size adjustment unit 2407. That is, the band limiting unit 2404 generates and obtains band limited-data. Note that since these units are the same as the contents of the fourth embodiment, a description thereof will not be repeated.

The processes of the sixth embodiment, which are different from those of the third embodiment, have been described, and other processes are the same as those of the third embodiment.

As described above, even in any of the aforementioned embodiments, when tone characteristics are controlled by applying different gains to respective portions of an input image, generation of a pseudo edge can be suppressed while satisfactory maintaining the contrast of an output image.

In any of the aforementioned embodiments, the image processing apparatus including the image capturing unit has been exemplified. However, the present invention is not limited to this, and is applicable to other image processing apparatuses as long as they execute a tone process using information of object regions.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-025897, filed Feb. 13, 2013, which is hereby incorporated by reference herein in its entirety.

What is claimed is:

1. An image processing apparatus comprising:
one or more computer processors configured to implement an image generation unit, gain data generation unit and a determination unit, wherein:
the image generation unit is configured to generate a second image as a low-frequency image of a first image by extracting a low-frequency component from the first image which is input;
the gain data generation unit is configured to generate a first gain data by associating gains with luminance values of respective pixels in the first image and generate a second gain data by associating gains with luminance values of respective pixels in the second image;
the determination unit is configured to determine a control gain for the first image based on the first gain data and the second gain data generated by the gain data generation unit, and
wherein the determination unit determines the control gain for a pixel of interest in the first image using a first gain value corresponding to the pixel of interest in the first gain data and a second gain value corresponding to a pixel whose gain value in the second gain data falls within a range in which a difference from a gain value corresponding to the pixel of interest in the first gain data is smaller than a predetermined value, among pixels in a surrounding region of the pixel of interest in the second gain data.

2. The apparatus according to claim 1, wherein the determination unit determines the control gain for the pixel of interest in the first image using an average value of the first gain value and the second gain value.

3. The apparatus according to claim 2, wherein the second gain value is obtained by performing weighted average of a plurality of gains corresponding to respective pixels in the surrounding region.

4. The apparatus according to claim 3, wherein the second gain value is obtained by performing weighted average such that as gain whose difference from the gain for the pixel of interest in the first gain data becomes smaller a weight for the gain increases.

5. The apparatus according to claim 2, wherein the determination unit determines the control gain for the pixel of interest in the first image using an average value of a first average value of the first gain value and the second gain value and a second average value of the first gain value and a third gain value corresponding to the pixel of interest in the second gain data.

6. The apparatus according to claim 5, wherein the determination unit determines the control gain for the pixel of interest in the first image by performing weighted average such that a weight for the second average value is increased as a difference between the first average value and the second average value increases.

7. An image processing method comprising:

generating a second image as a low-frequency image of a first image by extracting a low-frequency component from the first image which is input;

generating a first gain data by associating gains with luminance values of respective pixels in the first image and generating a second gain data by associating gains with luminance values of respective pixels in the second image; and determining a control gain for the first image based on the first gain data and the second gain data generated by the first and second gain data generating;

wherein in the determining, the control gain for a pixel of interest in the first image is determined using a first gain value corresponding to the pixel of interest in the first gain data and a second gain value corresponding to a pixel whose gain value in the second gain data falls within a range in which a difference from a gain value corresponding to the pixel of interest in the first gain data is smaller than a predetermined value, among pixels in a surrounding region of the pixel of interest in the second gain data.

* * * * *